(12) United States Patent
Hirakawa

(10) Patent No.: US 11,093,187 B2
(45) Date of Patent: Aug. 17, 2021

(54) INFORMATION PROCESSING APPARATUS, AND METHOD FOR GENERATING VIRTUAL PRINTER TO RECEIVE PRINT DATA AND CONVERT THE PRINT DATA INTO INTERPRETABLE PRINT DATA FOR A PRINTER

(71) Applicant: CANON KABUSHIKI KAISHA, Tokyo (JP)

(72) Inventor: Satoshi Hirakawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/904,236

(22) Filed: Jun. 17, 2020

(65) Prior Publication Data
US 2020/0401357 A1 Dec. 24, 2020

(30) Foreign Application Priority Data
Jun. 20, 2019 (JP) .............................. JP2019-114524

(51) Int. Cl.
*G06F 3/12* (2006.01)

(52) U.S. Cl.
CPC .......... *G06F 3/1255* (2013.01); *G06F 3/1204* (2013.01); *G06F 3/1206* (2013.01); *G06F 3/1231* (2013.01); *G06F 3/1298* (2013.01); *G06F 3/1228* (2013.01); *G06F 3/1247* (2013.01)

(58) Field of Classification Search
None
See application file for complete search history.

(56) References Cited

U.S. PATENT DOCUMENTS

| 8,743,405 | B2* | 6/2014 | Oishi | G06F 3/1204 |
| | | | | 358/1.15 |
| 2007/0177202 | A1* | 8/2007 | Miyata | G06F 3/1286 |
| | | | | 358/1.15 |
| 2010/0188700 | A1* | 7/2010 | Fujimori | G06F 3/1256 |
| | | | | 358/1.15 |
| 2012/0188602 | A1* | 7/2012 | Shirai | H04L 41/12 |
| | | | | 358/1.15 |
| 2012/0274979 | A1* | 11/2012 | Uchida | G06F 3/1236 |
| | | | | 358/1.15 |
| 2014/0300914 | A1* | 10/2014 | Yamazaki | G06F 3/1285 |
| | | | | 358/1.13 |
| 2015/0220815 | A1* | 8/2015 | Akiyama | G06F 3/1256 |
| | | | | 358/1.15 |
| 2016/0011830 | A1* | 1/2016 | Asakura | G06F 3/1229 |
| | | | | 358/1.15 |
| 2016/0162227 | A1* | 6/2016 | Kato | G06F 3/1292 |
| | | | | 358/1.13 |

FOREIGN PATENT DOCUMENTS

JP  2016-110520 A  6/2016

* cited by examiner

*Primary Examiner* — Haris Sabah
(74) *Attorney, Agent, or Firm* — Canon U.S.A., Inc. IP Division

(57) ABSTRACT

An apparatus and a method are provided in which a virtual printer service of a host computer automatically acquires from a real printer a response in response to a device search request without receiving the virtual printer generation instruction from a user, and a virtual printer configured to transmit a print job to the printer is then generated for each printer that responded to the device search request.

15 Claims, 21 Drawing Sheets

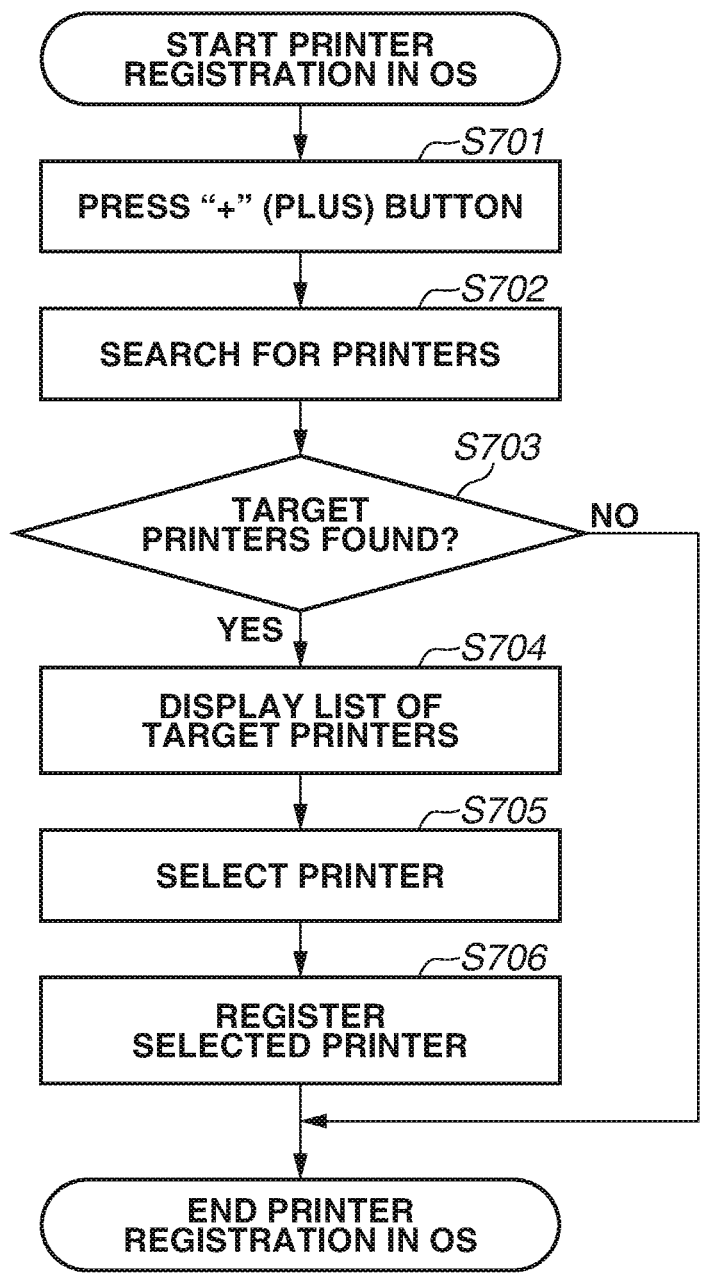

INFORMATION PROCESSING APPARATUS, AND METHOD FOR GENERATING VIRTUAL PRINTER TO RECEIVE PRINT DATA AND CONVERT THE PRINT DATA INTO INTERPRETABLE PRINT DATA FOR A PRINTER

BACKGROUND

Field

The present disclosure relates to an information processing apparatus capable of generating a virtual device configured to transmit a print job to an image forming apparatus.

Description of the Related Art

To use a peripheral device, such as an image forming apparatus, from an information processing apparatus, a specific device driver conforming to the peripheral device is generally installed in an operating system (hereinafter referred to as an OS) operating on the information processing apparatus. More specifically, to use an image forming apparatus, a printer driver applicable thereto is installed to use the image forming apparatus.

In recent years, printing systems for enabling printing, without using a printer driver, by using a specific protocol have been introduced to OS's. For example, printing systems supporting AirPrint (registered trademark) from Apple Inc., Android (registered trademark) from Google Corporation, and Mopria (registered trademark) of Microsoft Windows (registered trademark) have been introduced. In this case, it is not necessary to install a printer driver applicable to an image forming apparatus in an OS. The OS performs both the print job generation and the print job transmission to the image forming apparatus, as discussed in Japanese Patent Application Laid-Open No. 2016-110520. AirPrint is a part of the functions of the OS.

SUMMARY

However, if an image forming apparatus not supporting a printing system, such as AirPrint and Mopria, receives a print job from the OS, conventionally the image forming apparatus cannot interpret the print job.

In consideration of the above-discussed points, according to an aspect of the present disclosure, an information processing apparatus includes at least one processor and a storage that stores an application. Execution of the application by the at least one processor causes the information processing apparatus to determine whether a virtual printer has been generated, the virtual printer being configured to receive print data from an operating system (OS) and instruct a printer to perform printing based on the received print data, prompt a user to generate the virtual printer based on a determination that the virtual printer has not been generated, search a network for a printer based on an instruction to generate the virtual printer from the user, and generate a virtual printer for the printer found by the search.

Further features of the present disclosure will become apparent from the following description of exemplary embodiments with reference to the attached drawings.

BRIEF DESCRIPTION OF THE DRAWINGS

FIG. 9 is a flowchart illustrating an example of processing for registering printers in an operating system (OS).

DESCRIPTION OF THE EMBODIMENTS

Figure 1:
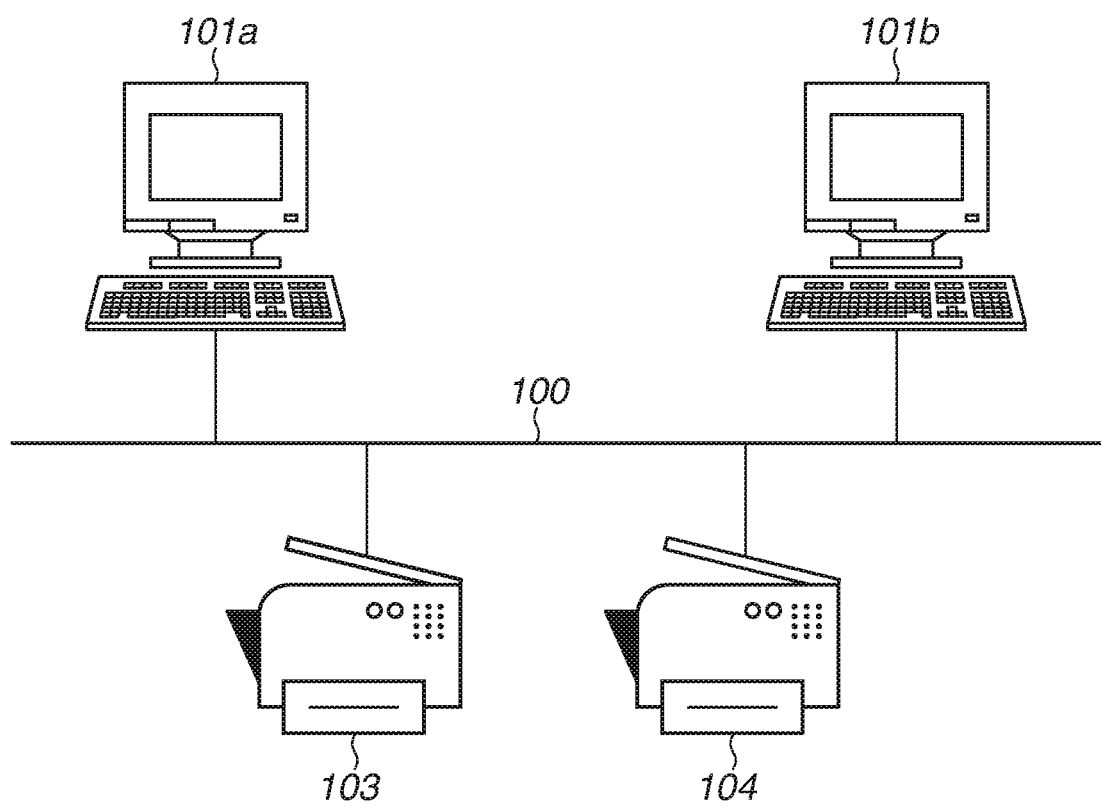
FIG. 1 illustrates an example of an overall configuration of a print system according to an exemplary embodiment of the present disclosure.

A first exemplary embodiment of the present disclosure will be described below. FIG. 1 illustrates an example of an overall configuration of a print system according to an exemplary embodiment of the present disclosure.

A system according to the present exemplary embodiment includes host computers 101a and 101b and printers 103 and 104.

The host computers 101a and 101b are examples of information processing apparatuses, such as personal computers (PCs). The printers 103 and 104 are image forming apparatuses for receiving print data in the Page Description Language (hereinafter referred to as PDL) format and the raster format and performing printing.

These apparatuses can communicate with each other via a network 100. The network 100 is a Local Area Network (LAN) or Intranet and can include a Wide Area Network (WAN).

The printers 103 and 104 may be single function printers having only a print function, or multifunction printers having a print function, scan function, and copy function.

One, or three or more host computers and printers may be connected to the network 100.

In the following common descriptions about the host computers 101a and 101b, the subscripts a and b for the reference numerals are omitted, and the host computers are collectively referred to as host computers 101. The subscripts a and b are also omitted for components of the host computers.

Figure 2:
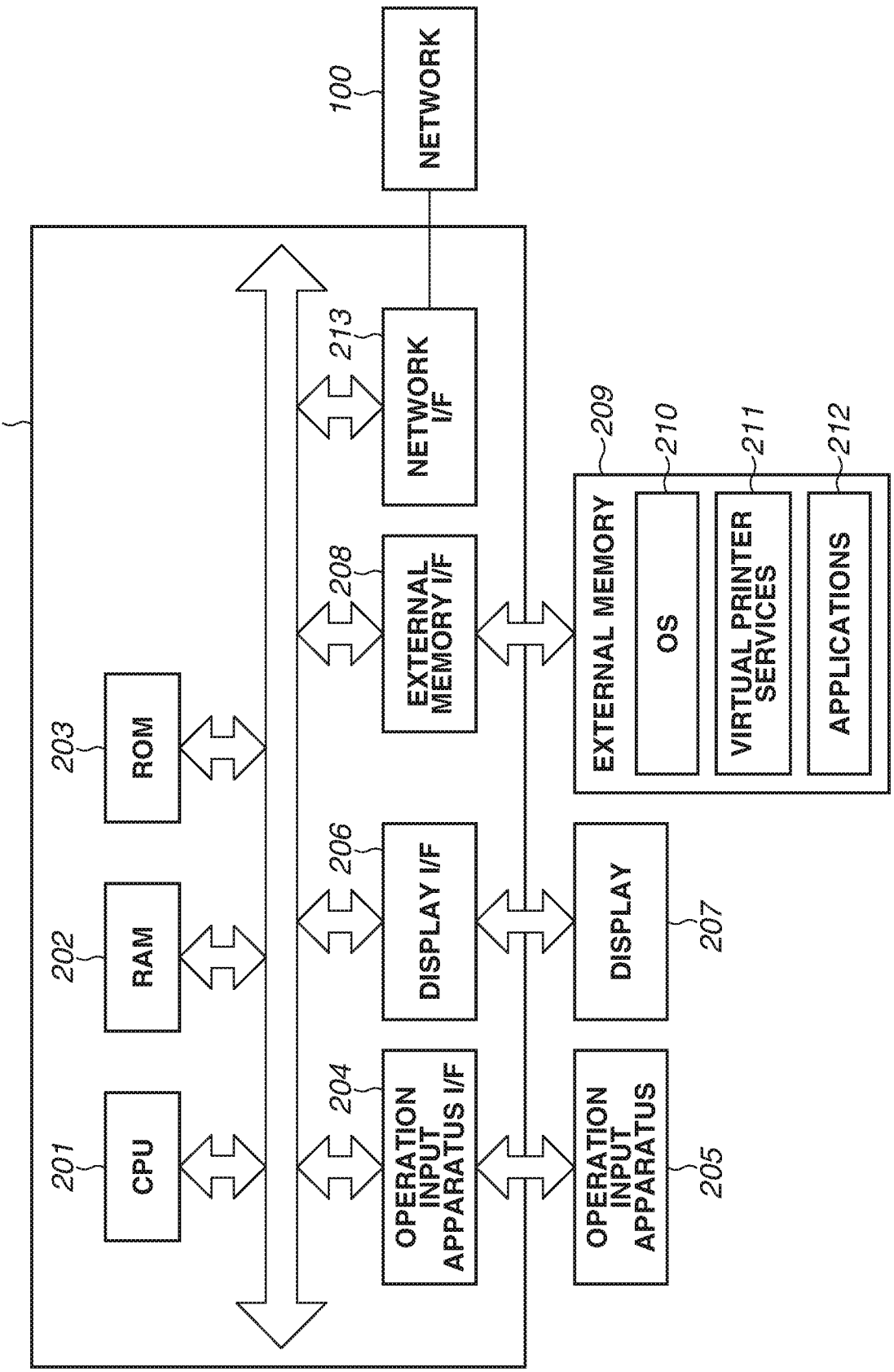
FIG. 2 illustrates a hardware configuration of an information processing apparatus which can configure a host computer.

FIG. 2 illustrates an example of a hardware configuration of an information processing apparatus which can configure a host computer 101.

A control unit including a central processing unit (CPU) 201 controls the operation of the entire host computer 101. The CPU 201 loads a program stored in a read only memory (ROM) 203 or an external memory 209 into a random access memory (RAM) 202 and then executes the program to control user interface (hereinafter referred to as UI) screens, generate and transmit print data, and perform other control.

The RAM 202 serves as the main memory of the CPU 201 and is also used as a work area or a temporary storage area for loading various programs. The ROM 203 stores control programs and the boot program executable by the CPU 201. An external memory interface (I/F) 208 is an interface for connecting the external memory 209 to the control unit. The external memory 209 stores, for example, an operating system (OS) 210, virtual printer services 211, and applications 212.

Although, in the present exemplary embodiment, an auxiliary storage device, such as a Hard Disk Drive (HDD) is assumed as the external memory 209, a nonvolatile memory, such as a Solid State Drive (SSD) may be used instead of or together with the HDD. Thus, the CPU 201, the RAM 202, the ROM 203, the external memory 209, and other hardware components configure a computer.

An operation input apparatus I/F 204 is an interface for controlling an operation input apparatus 205, such as a keyboard, a pointing device (mouse), and a touch-input device. The operation input apparatus 205 functions as a reception unit for receiving operations from the user.

A display I/F 206 controls screen display on a display 207. The display 207 functions as a display unit for displaying information to the user.

The host computer 101 is connected to the network 100 via a network I/F 213. The network I/F 213 performs print data transmission to the printers 103 and 104 on the network 100 and communication via the Internet. Data communications with external terminals on the network 100 include wireless communication conforming to IEEE 802.11 Series and communication via a wire cable, such as a LAN cable.

The external memory 209 of the host computer 101 according to the present exemplary embodiment includes the OS 210, the virtual printer services 211 (described below), and various applications 212 all of which are installed therein. The functions of these pieces of software (described below) are implemented by the CPU 201 loading a program stored in the ROM 203 or the external memory 209 into the RAM 202 and then executes the program.

Figure 3:
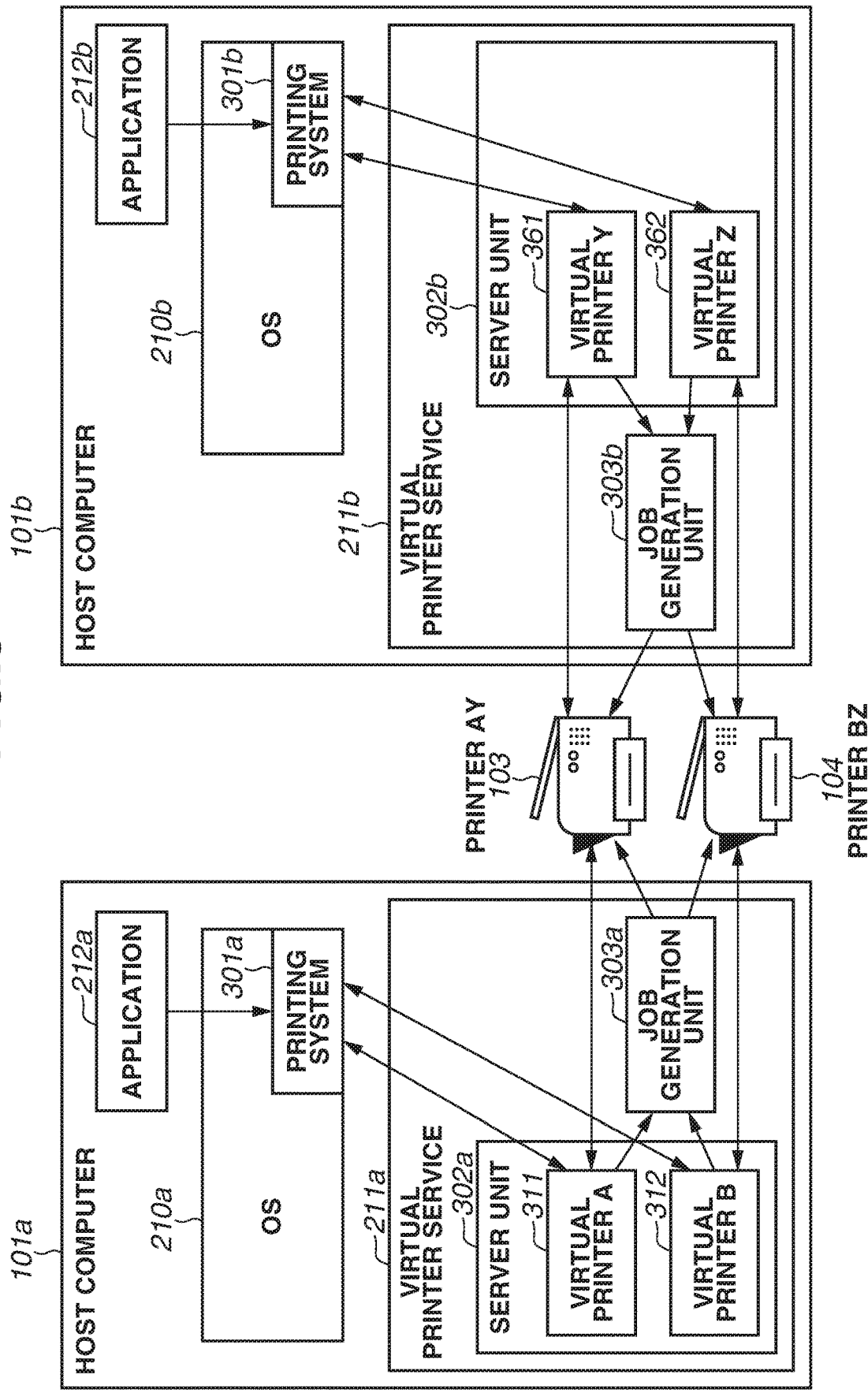
FIG. 3 illustrates software configurations of the host computers.

FIG. 3 illustrates a software configuration of the host computers 101a and 101b.

A printing system 301a is a function of an OS 210a installed in the host computer 101a. The printing system 301a performs control related to printing operations from the host computer 101a. By using a specific protocol, the printing system 301a can perform printing without using a printer driver. The printing system 301a is a printing system supporting, for example, AirPrint (registered trademark) from Apple Inc., Android (registered trademark) from Google Corporation, and Mopria (registered trademark) of Microsoft Windows (registered trademark).

A virtual printer service 211a includes a job generation unit 303a and a server unit 302a.

A virtual printer A 311 and a virtual printer B 312 are generated in the server unit 302a. In this example, the virtual printer A 311 is generated in association with a printer AY 103 which is a real printer for forming an image on a sheet. Similarly, the virtual printer B 312 is generated in association with a printer BZ 104 which is a real printer.

According to the present exemplary embodiment, printers that are generated in a host computer 101 by the virtual printer services 211 and respond to a predetermined search protocol as in a real printer are referred to as virtual printers (for example, the virtual printers A 311 and B 312). A virtual printer receives print data through a specific protocol, generates or converts print data, and transmits the print data to a real printer. The real printer body (e.g., the printer AY 103 and the printer BZ 104) is referred to as a real printer.

When the virtual printers A 311 and B 312 receive a printer search request (device search request) over the predetermined search protocol from the OS 210a, the virtual printers A 311 and B 312 return printer information in conformance with the above-described search protocol. The virtual printers A 311 and B 312 perform communication, such as the detection of the statuses of the associated printer AY 103 and printer BZ 104, respectively, over the above-described search protocol. The present exemplary embodiment will be described below based on the Bonjour (registered trademark) protocol from Apple Inc. as an example of search protocols supported by the OS 210 of the host computer 101. The Bonjour protocol employs the Multicast Domain Name System (DNS) technology for device search. The above-described search protocol is not limited to Bonjour, and may be other similar function protocols.

The virtual printer A 311 (virtual printer B 312) receives a print job from the printing system 301a of the OS 210 in which the virtual printer A 311 (virtual printer B 312) is registered as a transmission destination of the print job based on the response to the above-described search request. The virtual printer A 311 (virtual printer B 312) converts the received print job into a predetermined format interpretable by the job generation unit 303a and transmits the print job to the job generation unit 303a. In response to the print job received from the printing system 301a by each virtual printer, the job generation unit 303a generates a print job in a format processable by a real printer (the printer AY 103 or the printer BZ 104) and then transmits the print job to the real printer. The function of the job generation unit 303 may be included in the virtual printers. More specifically, a virtual printer generates a print job processable by a real printer based on the received print job and transmits the generated print job to the real printer.

The host computer 101b also has a similar configuration to that of the host computer 101a. More specifically, a printing system 301b is a function of an OS 210b installed in the host computer 101b. The printing system 301b performs control related to printing operations from the host computer 101b. A virtual printer service 211b includes a job generation unit 303b and a server unit 302b. The server unit 302b includes a virtual printer Y 361 and a virtual printer Z 362 generated therein. In this example, the virtual printer Y 361 is generated in association with the printer AY 103 which is a real printer. Similarly, the virtual printer Z 362 is generated in association with the printer BZ 104 which is a real printer.

A virtual printer is also referred to as a virtual device, and a virtual printer service is also referred to as a virtual device service.

Figure 4:
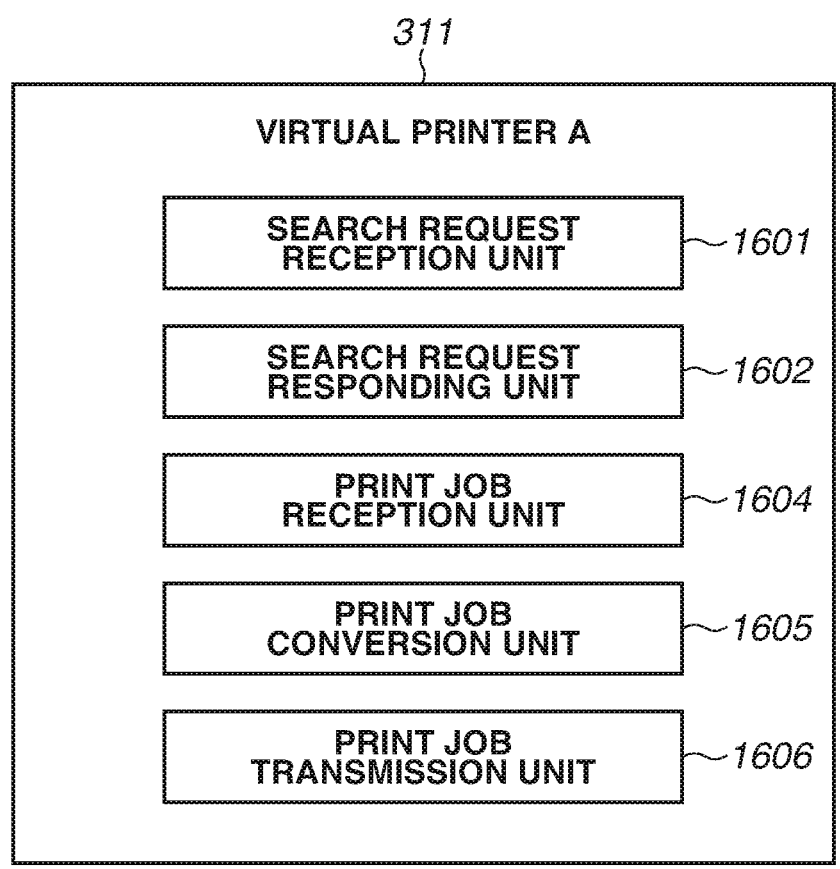
FIG. 4 illustrates a software configuration of a virtual printer.

FIG. 4 illustrates an example of a software configuration of a virtual printer. FIG. 4 illustrates the virtual printer A 311 as an example of a virtual printer. Other virtual printers also have a software configuration similar to that of the virtual printer A 311.

A virtual printer according to the present exemplary embodiment includes a search request reception unit 1601, a search request responding unit 1602, a print job reception unit 1604, a print job conversion unit 1605, and a print job transmission unit 1606.

The search request reception unit 1601 receives a printer search request based on the Bonjour protocol.

In response to the printer search request, the search request responding unit 1602 issues printer information in conformance with the Bonjour protocol.

The search request reception unit 1601 and the search request responding unit 1602 respond only to search requests conforming to the Bonjour protocol.

The print job reception unit 1604 receives a print job over a specific protocol from the printing system 301a. For example, the print job reception unit 1604 receives a print job generated, with the file as the source of the print job opened by an application 212a in the host computer 101a, when the user issues a print instruction on the application 212a. This application 212a includes various applications operating on the OS 210a, such as a word processor application, a spreadsheet calculation application, a web browser application, and an image editing application.

The print job conversion unit 1605 converts the print job received by the print job reception unit 1604 into a format recognizable by the job generation unit 303a. Although examples of formats recognizable by the job generation unit 303a include Portable Document Format (PDF), the format is not limited thereto.

The print job transmission unit 1606 transmits the print job obtained by the conversion by the print job conversion unit 1605 to the job generation unit 303a.

Figure 5:
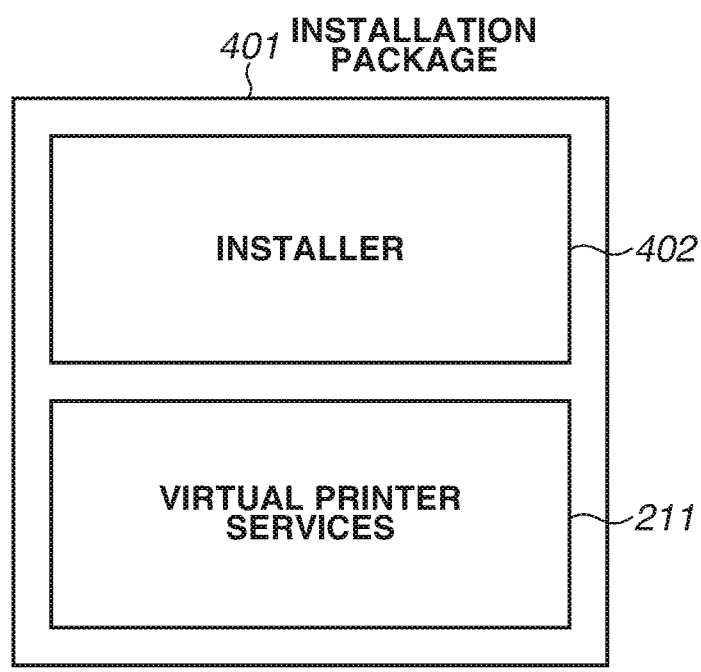
FIG. 5 illustrates a software configuration of an installation package of virtual printer services.

FIG. 5 illustrates an example of a software configuration of an installation package for installing virtual printer services.

An installation package 401 includes an installer 402 and the virtual printer services 211. When the installation package 401 is executed on a host computer 101, the installer 402 operates to perform processing for installing a virtual printer service 211 on the host computer 101. Through this installation processing, the virtual printer service 211 is stored in the external memory 209 of the host computer 101. At the time of program execution, the virtual printer service 211 is loaded into the RAM 202 and then executed by the CPU 201. The virtual printer service 211 is an application and can produce a plurality of virtual printers.

Figure 6:
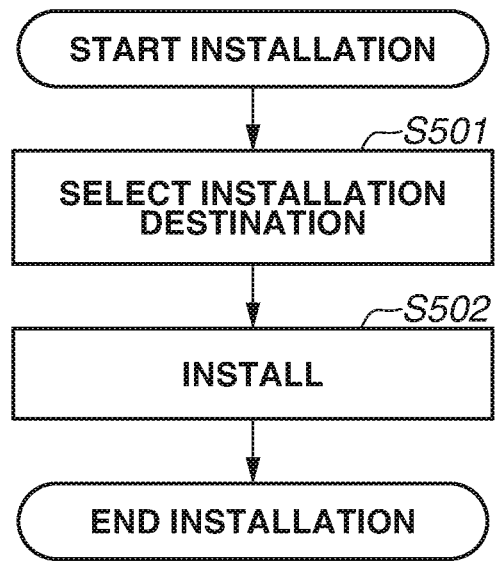
FIG. 6 is a flowchart illustrating an example of installation processing of virtual printer services.

FIG. 6 is a flowchart illustrating an example of processing for installing the virtual printer service 211. This installation processing is started, for example, when the OS 210 of the host computer 101 executes the installation package 401 of the virtual printer service 211 downloaded from an existing web site (or recorded in a recording medium, such as a compact disc read only memory (CD-ROM)).

In step S501, the installer 402 included in the installation package 401 performs processing for selecting the installation destination of the virtual printer service 211. The installer 402 displays an installation destination selection screen (not illustrated) on the display 207 of the host computer 101, and acquires information about the installation destination input to the installation destination selection screen by the user. The installation selection screen displays, for example, "Select disk in which virtual printer service is to be installed" to prompt the user to select the external memory in which the virtual printer service 211 is to be installed.

In step S502, the installer 402 installs the virtual printer service 211 in the host computer 101. The installation destination is a location according to the information about the installation destination acquired in step S501. The installed virtual printer service 211 is executed and activated by the installer 402 or the OS 210.

A description will be provided of operations of the virtual printer service 211 in a case where the virtual printer service 211 displays the main UI of the virtual printer service 211 illustrated in FIG. 8A (described below) in response to a user operation. In this case, the virtual printer service 211 starts processing for generating a first virtual printer illustrated in FIG. 7.

Figure 7:
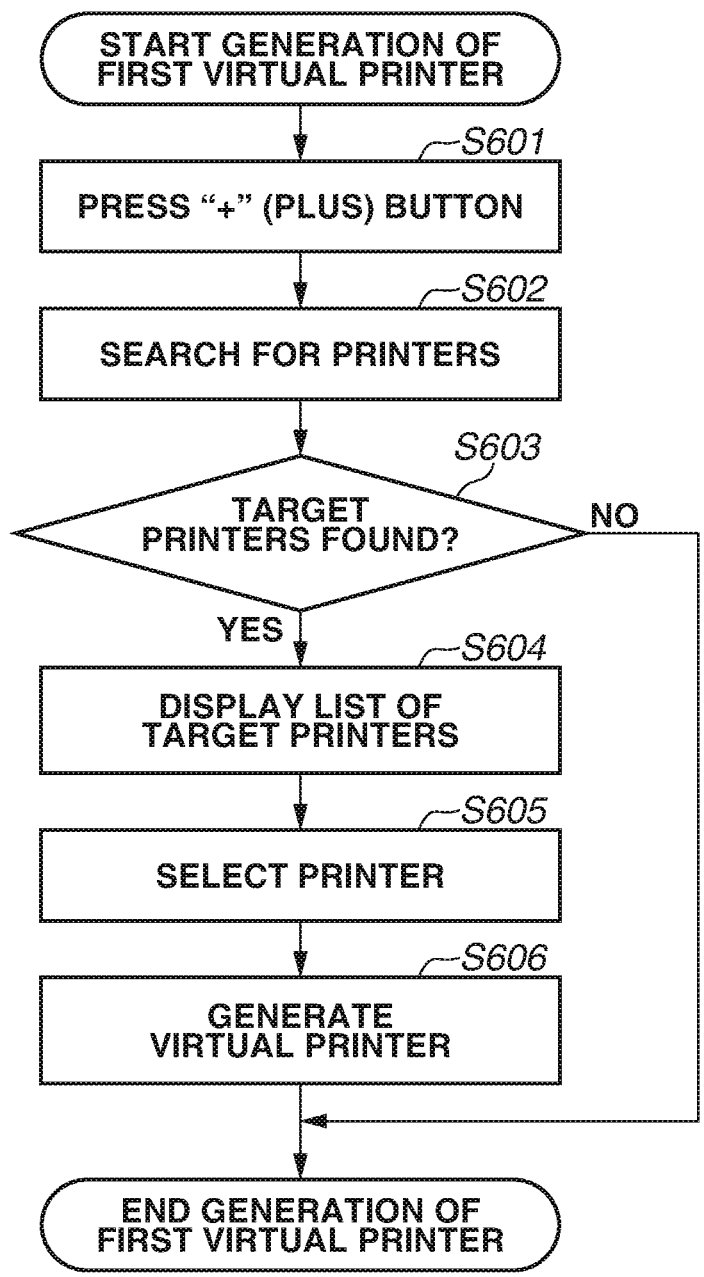
FIG. 7 is a flowchart illustrating an example of first virtual printer generation processing.

FIG. 7 is a flowchart illustrating an example of processing for generating a first virtual printer. Processing of this flowchart is executed by the virtual printer service 211 in response to a main UI display operation by the user.

In step S601, when the user presses an addition button for adding a virtual printer, i.e., "+" (plus) button 1004 in the main UI illustrated in FIG. 8A (described below), the virtual printer service 211 detects the depression. The virtual printer service 211 that has detected the depression of the "+" (plus) button 1004 displays a virtual printer addition screen illustrated in FIG. 8B (described below). The processing then proceeds to step S602. The UI of the virtual printer service 211 will be described below with reference to FIGS. 8A and 8B.

Figure 8A:
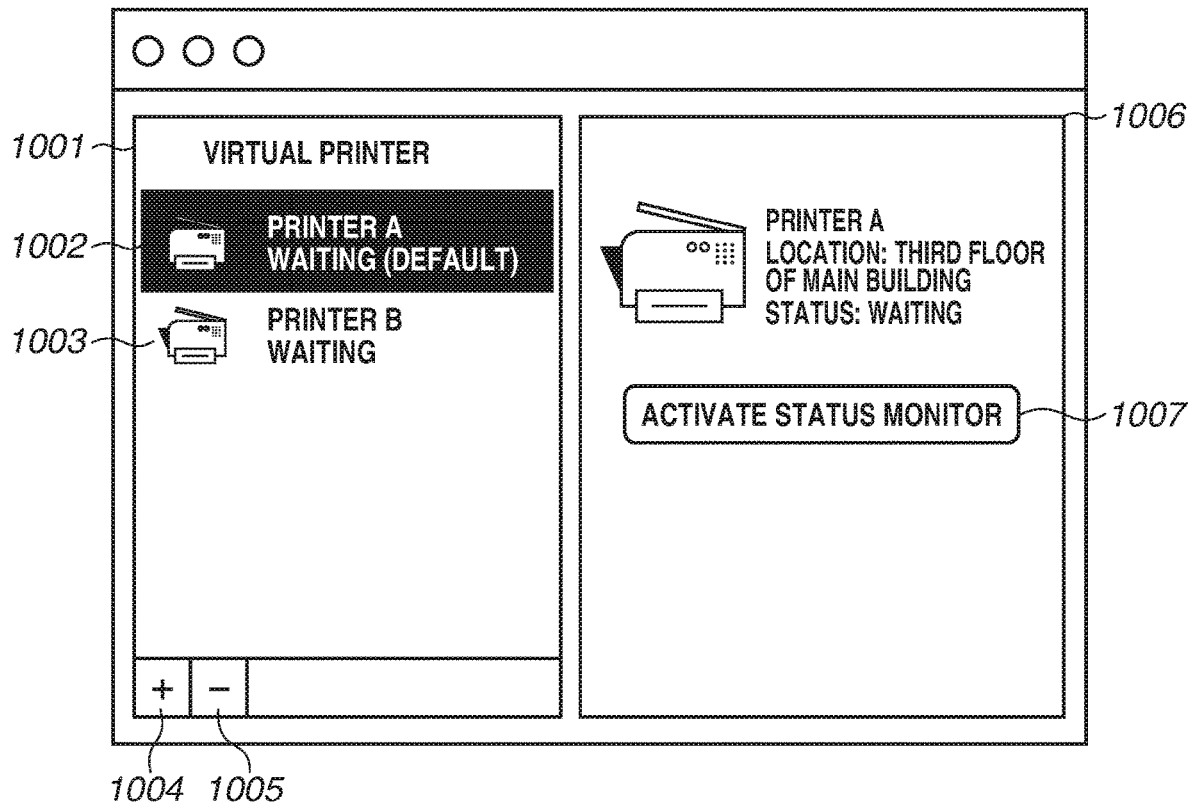
FIGS. 8A and 8B illustrate examples of user interfaces (UIs) of virtual printer services.
Figure 8B:
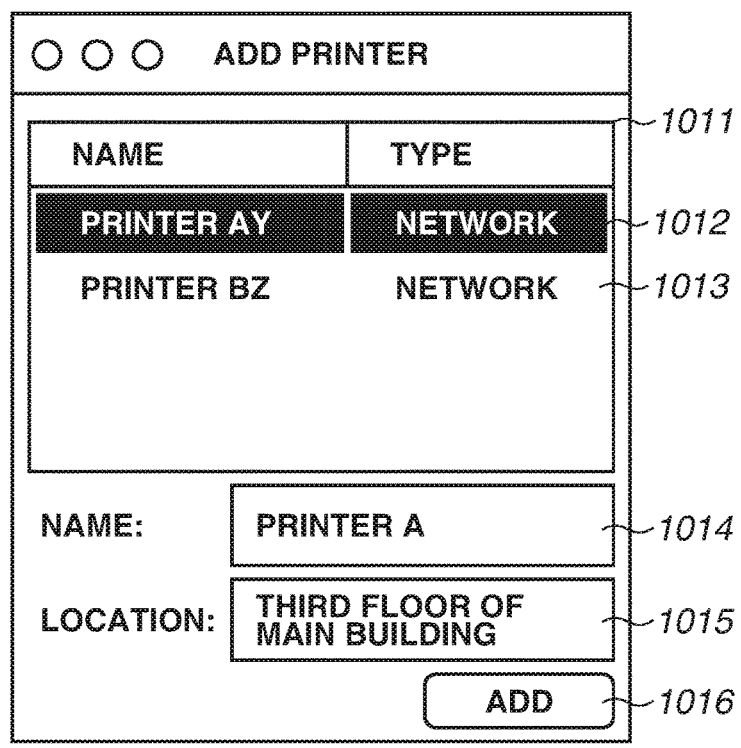

FIGS. 8A and 8B illustrate examples of UIs of the virtual printer service 211. The UI of the virtual printer service 211 is displayed on the display 207 of the host computer 101 activated by the virtual printer service 211.

FIG. 8A illustrates an example of the main UI of the virtual printer service 211.

Referring to FIG. 8A, a printer list area 1001 displays a list of the virtual printers generated by the server unit 302. FIG. 8A illustrates the UI in a state where two virtual printers (printers A and B) have already been registered.

An area 1002 displays the icon, name, and status of the virtual printer A 311. Similarly, an area 1003 displays the icon, name, and status of the virtual printer B 312. Here, immediately after the installation, the virtual printer service 211 has generated no virtual printer, and therefore the printer list area 1001 displays no virtual printer.

When the user presses the "+" (plus) button 1004, a new virtual printer can be added. The UI when the "+" (plus) button 1004 is pressed will be described below with reference to FIG. 8B. When the user presses a "−" (minus) button 1005, the user can delete the virtual printer selected in the printer list area 1001.

An area 1006 displays more detailed information about the virtual printer selected in the printer list area 1001. More specifically, the area 1006 displays the icon representing the printer, and the name, location, and status of the printer. When the user presses an "Activate status monitor" button 1007, the status of the printer AY 103 can be displayed in more detail.

FIG. 8B illustrates an example of the UI (virtual printer addition screen) displayed when the user presses the plus "+" button 1004 illustrated in FIG. 8A. Referring to FIG. 8B, an area 1011 displays a list of printers supported by the virtual printer service 211 among printers existing in the network to which the host computer 101 are connected and printers connected via Universal System Bus (USB). In this example, the printer AY 103 and the printer BZ 104 connected to the network 100 are displayed in the areas 1012 and 1013, respectively. The user selects the printer to be subjected to the virtual printer generation from the list, inputs a name 1014 and a location 1015, and then presses an Add button 1016. The UI then redisplays the screen illustrated in FIG. 8A in which the virtual printer name of the added virtual printer (the name input as the name 1014) is added to the printer list area 1001.

With reference to FIG. 7 again, the flowchart will be further described below.

After displaying the virtual printer addition screen (FIG. 8B), then in step S602, the virtual printer service 211 performs printer search processing. The printer search processing is implemented by performing the processing illustrated in FIG. 12 (described below). For example, by using the function of the OS 210, the virtual printer service 211 transmits a search request to the network 100 through the Bonjour protocol and receives a response in response to the search request from devices on the network 100, thus performing device search.

In step S603, the virtual printer service 211 determines whether the printers found in step S602 include the target printers for the virtual printer service 211. For the determination for the target printers, the virtual printer service 211 uses a list of the target printers for the virtual printer service 211 stored in the virtual printer service 211. In a case where this list includes the printers found in step S602, the virtual printer service 211 determines the printers as the target printers.

Table 1 illustrates an example of information about a list of the target printers for the virtual printer service.

TABLE 1

| | Printer Name |
|---|---|
| Target Printers for Virtual Printer Service | Printer AY Printer BZ Printer CX |

The list of the target printers displays only the printers supported by the virtual printer service 211 among printers not supported by the printing system which enables printing without using a printer driver (i.e., among printers not conforming to a specific protocol). This list is prestored in the virtual printer service 211 before the virtual printer service 211 is installed.

Referring now to Table 1, "Printer Name" indicates the names of the applicable printers.

Table 2 illustrates an example of information about a list of the printers found in step S602.

TABLE 2

| | Printer Name | IP Address | Service Type |
|---|---|---|---|
| Printers Found in Step S602 | Printer AY Printer BZ | 1.1.1.3 1.1.1.4 | _printer._tcp _printer._tcp |

Referring to Table 2, "Printer Name" indicates the names of the applicable printers. "Printer name" indicates the names of printers prestored in the applicable printers, and corresponds to the printer names notified (responded) in conformance with the Bonjour protocol from the applicable printer when the printer was found in step S602. "Printer Name" generally indicates names related to the printer models, and is also used in Table 1. An identifier for identifying the printer model, such as the printer model name, may be included in the notification (response) conforming to the Bonjour protocol from the printer.

"IP Address" indicates the addresses of the applicable printers on the network.

"Service Type" indicates the services supported by the applicable printers. For example, a device having the service type "_printer._tcp" means a printer conforming to the Line Printer Daemon (LPD) protocol.

Table 2 displays a list of all of the printers found in step S602.

The virtual printer service 211 compares the printers illustrated in Tables 1 and 2 to determine whether the found printers are the target printers for the virtual printer service 211. In the examples illustrated in Tables 1 and 2, the printer AY 103 and the printer BZ 104 are determined to be the target printers. In this determination, the virtual printer service 211 uses a list (what is called a white list) of printers that does not conform to a specific protocol and is supported by the virtual printer service 211. More specifically, in a case where the found printers are included in this list, the virtual printer service 211 determines that the printers are the target printers. However, the virtual printer service 211 may use a list (what is called a black list) of printers that conforms to a specific protocol or printers that is not supported by the virtual printer service 211. In such a case, in a case where the found printers are not included in this list, the virtual printer service 211 determines that the printers are the target printers. More specifically, the virtual printer service 211 needs to be configured to select the printers to be subjected to the virtual printer generation based on information, for example, a list for identifying printers not conforming to a specific protocol and printers supported by the virtual printer service 211.

If the printers found in step S602 include none of the target printers for the virtual printer service 211 (NO in step S603), the processing exits this flowchart.

If the printers found in step S602 include the target printers for the virtual printer service 211 (YES in step S603), the processing proceeds to step S604.

In step S604, the virtual printer service 211 displays the printer names of the printers determined to be the target printers in step S603, in the area 1011 of the virtual printer addition screen (FIG. 8B). In the above-described example, the printer names of the printer AY 103 and the printer BZ 104 connected to the network 100 are displayed in the areas 1012 and 1013, respectively. More specifically, the virtual printer service 211 presents to the user a list of printers selected based on the above-described list (e.g., the list illustrated in Table 1) among the printers found in step S602.

In step S605, the virtual printer service 211 performs processing for selecting the printer to be the connection destination of the virtual printer. When the user presses the Add button 1016 with the operation input apparatus 205, such as a mouse, in a state where any printer is selected in the area 1011 illustrated in FIG. 8B, the virtual printer service 211 detects this depression. The virtual printer service 211 acquires information about the printer name, the name 1014, and the location 1015 of the printer selected in the area 1011 from the virtual printer addition screen (FIG. 8B). Referring to the example illustrated in FIG. 8B, the virtual printer service 211 acquires "Printer AY" as the printer name of the selected printer, "Printer A" as the name of the printer, and "Third floor of main building" as the location of the printer.

In step S606, the virtual printer service 211 performs processing for generating a virtual printer. In this processing, the virtual printer service 211 associates the printer selected in step S605 as the connection destination and generates a virtual printer based on the name and location acquired in step S605. The virtual printer generated in this processing has information notified by the printer defined in the Bonjour protocol. For example, this information includes the connection destination of the virtual printer, the name of the virtual printer, and the function of the virtual printer. For example, the connection destination of the virtual printer corresponds to the IP address of the printer selected in step S605, more specifically to the IP address (illustrated in Table 2) acquired in the search processing in step 603. The function of the virtual printer corresponds to, for example, support PDL and support function. The function of the virtual printer differs for each printer selected in step S605 and is prestored in the virtual printer service 211 before the installation of the virtual printer service 211.

As described above, a virtual printer can be generated by a user operation.

To perform printing by using the generated virtual printer, the virtual printer is to be registered as a service program in the OS 210. The virtual printer registered as a service program in the OS 210 constantly operates during execution of the OS 210 and issues responses in response to inquiries from other programs and information apparatuses. The sequence of the device search processing illustrated in FIG. 13 (described below) is an example of the above-described processing. Accordingly, it seems to other programs and information apparatuses that virtual printers exist as real printers. Thus, virtual printers will be searched for as real printers in step S602. According to the present exemplary embodiment, since the found virtual printers are excluded from the target printers, no virtual printer to be connected with the found virtual printers is to be generated.

Processing for registering a virtual printer in the OS will be described below.

FIG. 9 is a flowchart illustrating an example of printer registration, processing for registering a printer in the OS 210. The processing of this flowcharts is started when the main UI (FIG. 10A) for registering a printing destination printer in the OS 210 is displayed in response to a user operation.

In step S701, when the user presses an addition button for adding a virtual printer, i.e., a "+" (plus) button 1104 illustrated in FIG. 10A (described below), the printing system 301 of the OS 210 detects the depression. In response to detection of the depression of the "+" (plus) button 1104, the printing system 301 of the OS 210 displays a printer registration screen illustrated in FIG. 10B. The processing then proceeds to step S702. The UI for registering a printing destination printer in the OS 210 will be described below with reference to FIGS. 10A and 10B.

Figure 10A:
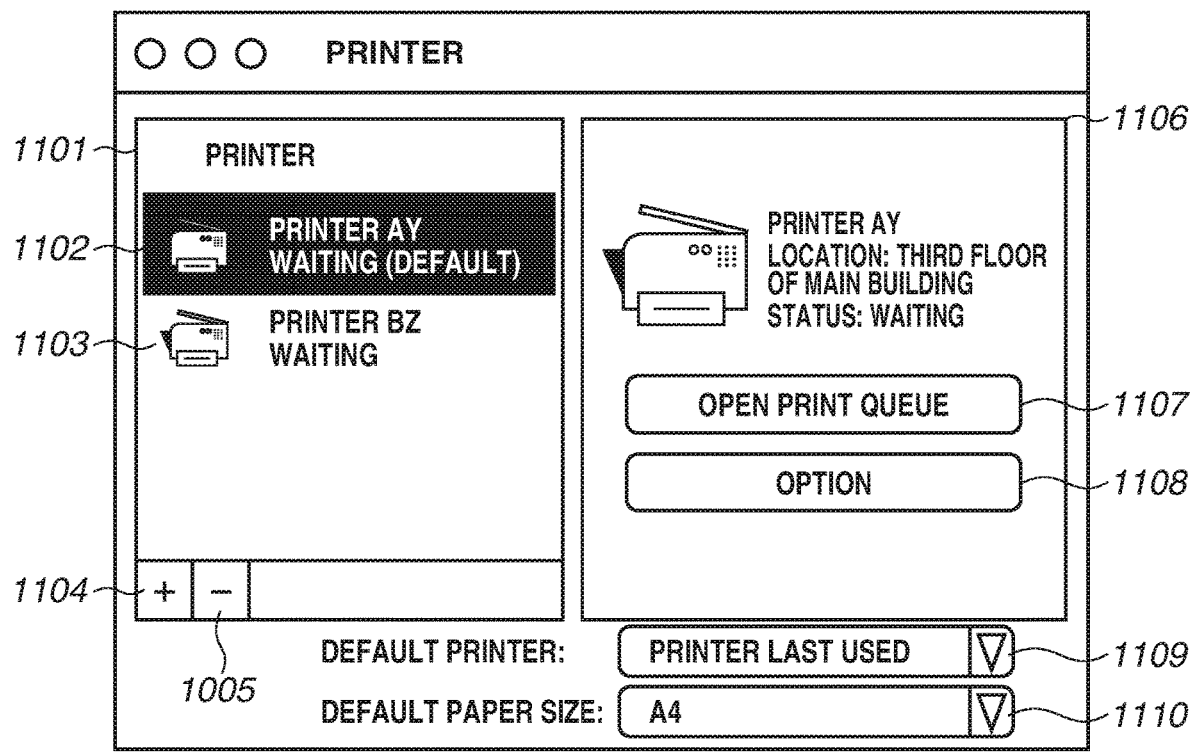
FIGS. 10A and 10B illustrate examples of UIs for registering printing target printers in the OS.
Figure 10B:
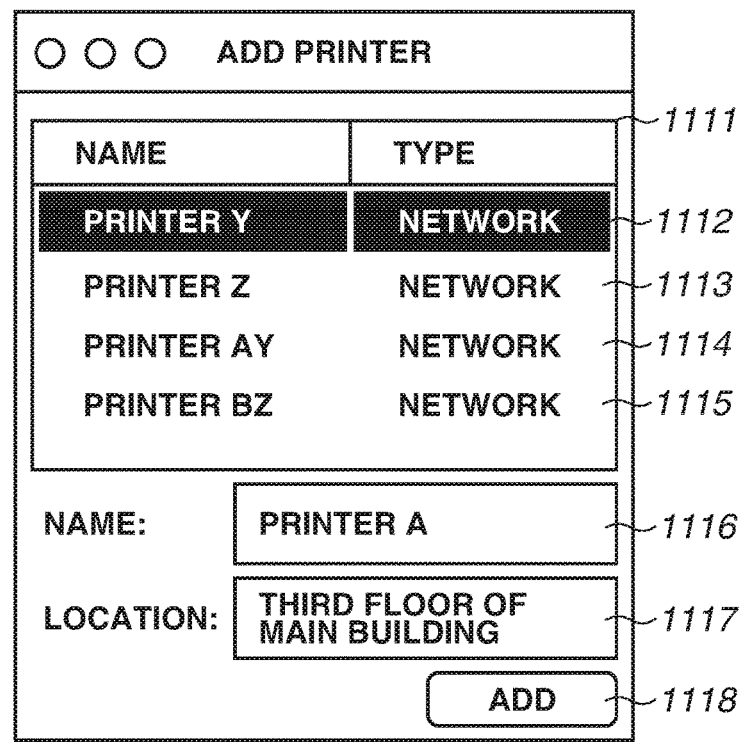

FIGS. 10A and 10B illustrates examples of UIs for registering a printing destination printer in the OS 210. The UI for registering a printing destination printer in the OS 210 is displayed on the display 207 of the host computer 101 on which the OS 210 is operating.

FIG. 10A illustrates the main UI for registering a printing destination printer in the OS 210.

Referring to the UI illustrated in FIG. 10A, a printer list area 1101 displays a list of printers which have already been registered as printing destination printers in the OS 210. This example in FIG. 10A illustrates an UI in a state where two printers (the printers AY and BZ) have been registered.

An area 1102 displays the icon, name, and status of the printer AY. Similarly, an area 1103 displays the icon, name, and status of the printer BZ.

When the user presses the "+" (plus) button 1104, a new virtual printer can be additionally registered. The UI when the "+" (plus) button 1104 is pressed will be described below with reference to FIG. 10B. When the user presses a "−" (minus) button 1105, the user can delete the virtual printer selected in the printer list area 1101.

An area 1106 displays more detailed information about the printer selected in the printer list area 1101. More specifically, the area 1106 displays the icon representing the printer, and the name, location, and status of the printer. When the user presses an "Open print queue" button 1107, the status of the printer selected in the area 1101 can be displayed in more detail. Further, by pressing an "Option" button 1108, the user can change the configuration of options (not illustrated) of the printer selected in the area 1101 and display a screen for displaying the remaining amount of the printing agent, such as toner and ink.

FIG. 10B illustrates an example of a UI (printer addition screen) displayed when the user presses the "+" (plus) button 1104 illustrated in FIG. 10A. An area 1111 illustrated in FIG. 10B displays a list of real printers existing in the connected network, USB-connected real printers, and virtual printers. The user can select the printer to be registered from the list in the area 1111 and then input a name 1116 and a location 1117. When the user presses an Add button 1118, the UI returns to the screen illustrated in FIG. 10A. The registered printer is additionally displayed in the printer list area 1101.

Returning back to FIG. 9 again, the flowchart illustrated in FIG. 9 will be further described.

The printing system 301 of the OS 210 which has displayed the printer registration screen illustrated in FIG. 10B performs the printer search processing in step S702. The printer search processing is implemented when the printing system 301 performs the processing illustrated in FIGS. 12 and 13 (described below). For example, the printing system 301 of the OS 210 transmits a search request conforming to the Bonjour protocol to the network 100 and receives a response in response to the search request from devices on the network 100, thus performing the device search processing.

In step S703, the printing system 301 of the OS 210 determines whether printers are found in step S702.

Table 3 illustrates an example of information about a list of the printers found in step S703.

TABLE 3

| | Printer Name | IP Address | Service Type |
|---|---|---|---|
| Printers Found In Step S703 | Printer Y | 1.1.1.30 | _ipp._tcp |
| | Printer Z | 1.1.1.40 | _ipp._tcp |
| | Printer AY | 1.1.1.3 | _printer._tcp |
| | Printer BZ | 1.1.1.4 | _printer._tcp |

Referring to Table 3, "Printer name" indicates the names of the applicable printers and corresponds to the printer names notified (responded) from the applicable printers in conformance with the Bonjour protocol.

"IP address" indicates the addresses of the applicable printers on the network.

"Service type" indicates the services supported by the applicable printers. For example, a device having the service type "_printer._tcp" means a printer conforming to the LPD protocol. A device having the service type "jpp._tcp" means a printer conforming to Internet Printing Protocol (IPP).

A device having the service type "_printer._tcp" or "_ipp._tcp" will be determined to be a printer. Printers satisfying the above-described condition among the printers illustrated in Table 3 include "Printer Y", "Printer Z", "Printer AY", and "Printer BZ".

If no printer was found in step S702 (NO in step S703), the processing exits this flowchart.

If at least one printer is found in step S702 (YES in step S703), the processing proceeds to step S704.

In step S704, the printing system 301 of the OS 210 displays a list of the devices determined to be printers in step S703, in the area 1111 illustrated in FIG. 10B as a printer. The area 1111 displays a list of real printers existing in the connected network, USB-connected real printers, and virtual printers. The listed virtual printers include not only the virtual printers generated in the host computer 101 on which the OS 210 is operating but also the virtual printers generated in other host computers existing in the network to which the host computer 101 is connected. In the example illustrated in FIG. 10B, the printer names of the real printers AY and BZ connected to the network are displayed in areas 1114 and 1115, respectively. The printer names of the virtual printers Y and Z generated in other host computer (the computer 101b) on the network 100 are also displayed in areas 1112 and 1113, respectively. Only those supported by the printing system 301 of the OS 210 (those conforming to a specific protocol) may be displayed in the area 1111 illustrated in FIG. 10B.

In step S705, the printing system 301 of the OS 210 performs processing for selecting the printer to be registered in the OS 210. When the user presses the Add button 1118 in a state where a printer is selected in the area 1111 illustrated in FIG. 10B, the printing system 301 of the OS 210 detects the depression. The printing system 301 then acquires information about the printer name, the name 1116, and the location 1117 of the selected printer from the printer registration screen (FIG. 10B). In the example illustrated in FIG. 10B, the printing system 301 acquires "Printer Y" as the printer name of the selected printer, "Printer A" as the name of the printer, and "Third floor of main building" as the location of the printer.

In step S706, the printing system 301 of the OS 210 registers the printer in the OS 210. In this process, the printing system 301 registers the printer selected in step S705 in the OS 210. The connection destination information is the IP address (illustrated in Table 3) acquired in the search processing in step S703. The printing system 301 registers the printer based on the information about the name and the location of the printer acquired in step S705 in the OS 210.

A virtual printer can be registered in the OS 210 in this way.

For the registered printer, the IP address, name, and location of the connection destination are stored in the external memory 209 of the host computer 101. The UI returns to the screen illustrated in FIG. 10A, and the registered printer is additionally displayed in the printer list area 1101. The registered printer can be then selected as a print job transmission destination from a print setting screen (not illustrated) of the OS 210 opened from an application 212, and printing by using a specific protocol is enabled.

A sequence of device search processing on the network will be described below.

Figure 11:
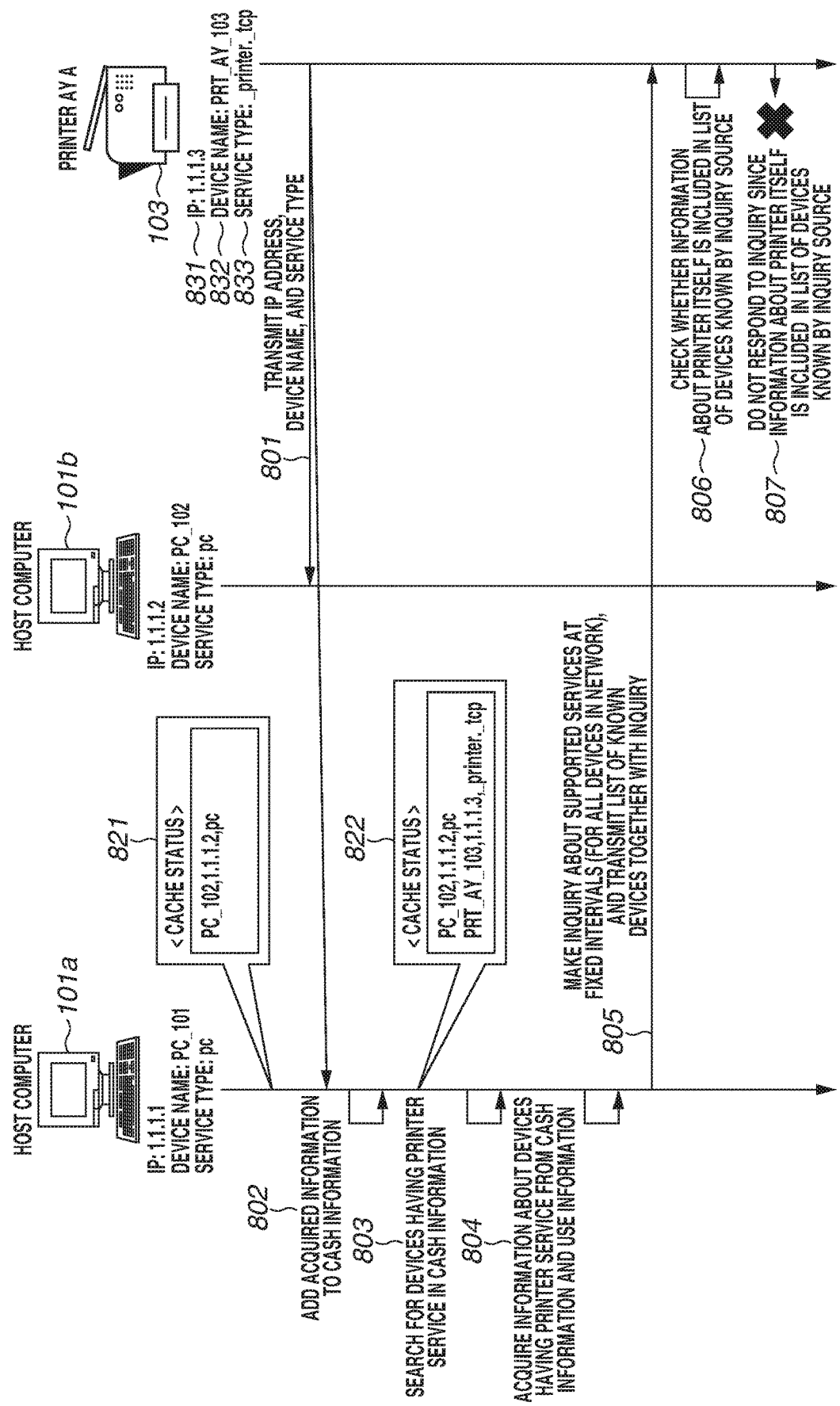
FIG. 11 is a sequence diagram illustrating device search processing on a network.

FIG. 11 is a sequence diagram illustrating the device search processing on the network in which the printer AY 103 notifies devices in the same network of the presence of the printer AY 103 itself.

In step 801, when the printer AY 103 participates in the network, the printer AY 103 notifies devices in the same network, of an IP address 831, a device name 832, and a service type 833 of the printer AY 103 by using the Multicast DNS technology. More specifically, the printer AY 103 notifies devices of the printer information in conformance with the Bonjour protocol. The service type is a value indicating services supported by devices in conformance with the Bonjour protocol. Examples of service types indicating a printer are illustrated in Table 4.

TABLE 4

| Service Type |
| --- |
| _printer._tcp |
| _ipp._tcp |

In step 802, the host computer 101a that has received the notification from the printer AY 103 adds the IP address 831, the device name 832, and the service type 833 of the printer AY 103 to cache information 821. The cache information refers to information used by a mechanism for reducing the load on the network in conformance with the Bonjour protocol. Examples of information included in the cache information 821 are illustrated in Table 5.

TABLE 5

|  | IP Address | Device Name | Service Type |
| --- | --- | --- | --- |
| Cache Information | 1.1.1.2 | PC_102 | pc |
|  | 1.1.1.3 | PRT_AY | _printer._tcp |
|  | . | . | . |
|  | . | . | . |
|  | . | . | . |

In step 803, in searching for devices on the network, the host computer 101a first searches for devices having the service types illustrated in Table 4 based on the cache information 822. In step 804, if the information about the printer AY 103 is included in the cache information 822, the host computer 101a uses the information about the printer AY 103 included in the cache information 822 for subsequent processing.

In step 805, through the Multicast DNS technology, the host computer 101a makes an inquiry to devices existing in the same network about supported services at regular intervals. More specifically, the host computer 101a transmits a device search request conforming to the Bonjour protocol. The host computer 101a notifies devices existing in the same network of a list of the devices known by the host computer 101a (a list based on the cache information 822), together with the inquiry.

In step 806, the printer AY 103 that has received the inquiry from the host computer 101a checks whether the printer AY 103 is included in the list 822 of the devices known by the host computer 101a. In step 807, the printer AY 103 determines that the printer AY 103 is included in the list 822 of the devices known by the host computer 101a, and thus does not respond to the inquiry of the host computer 101a, in this example.

Figure 12:
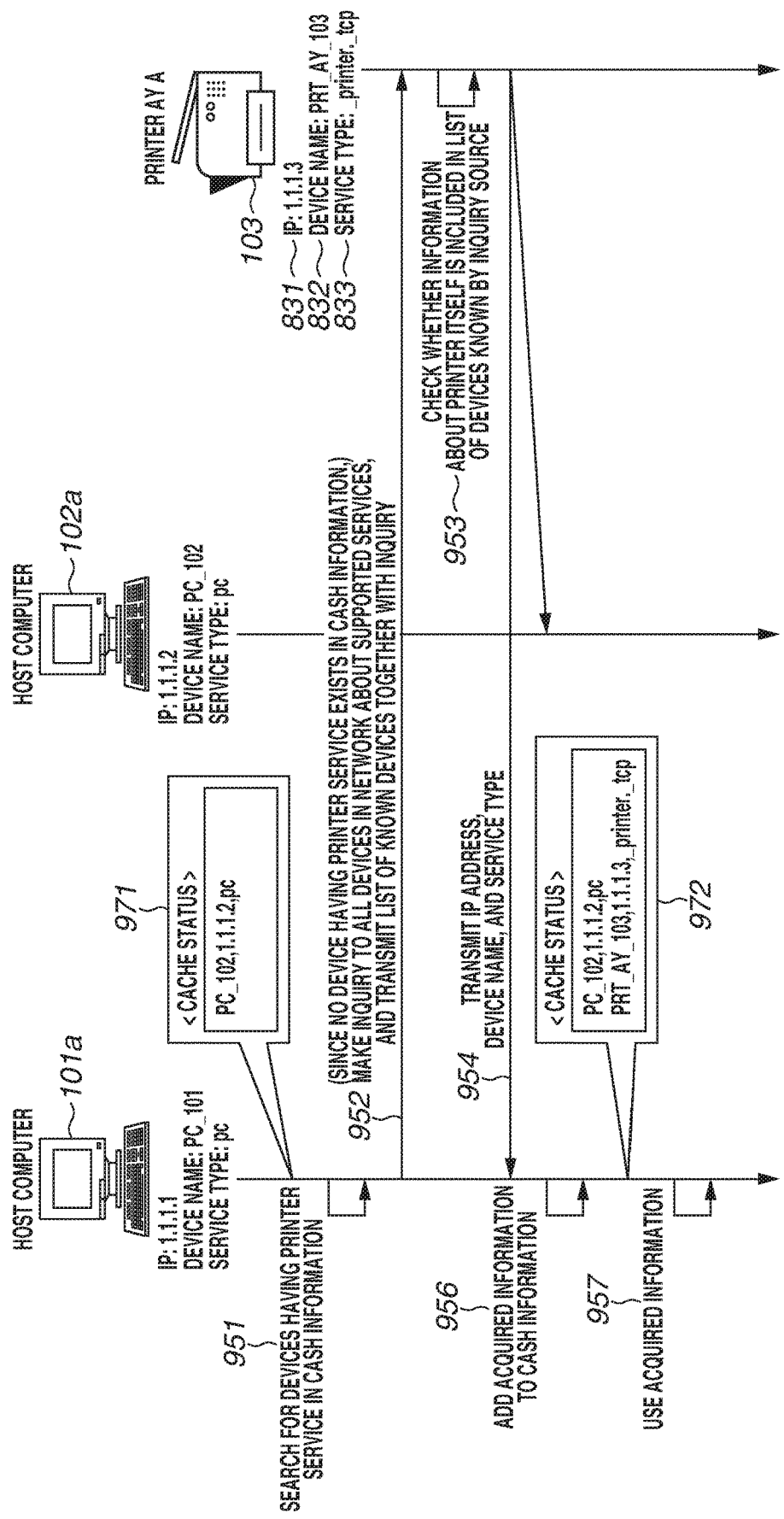
FIG. 12 is another sequence diagram illustrating device search processing on the network.

FIG. 12 is a sequence diagram illustrating the device search processing on the network in which the printer AY 103 notifies the host computer 101a of the IP address 831, the device name 832, and the service type 833, in response to the search request from the host computer 101a.

In step 951, the host computer 101a searches for devices having the service types illustrated in Table 4 based on cache information 971. In step 952, in a case where no device corresponding to the cache information 971 exists, the host computer 101a makes an inquiry to devices existing in the same network about supported services by using the Multicast DNS technology. More specifically, the host computer 101a transmits a device search request conforming to the Bonjour protocol. In step 805 (illustrated in FIG. 11), even in a case where the applicable device exists, the host computer 101a makes an inquiry to devices existing in the same network about supported services at regular intervals. The host computer 101a notifies devices existing in the same network of a list 971 of the devices known by the host computer 101a, together with the inquiry.

In step 953, the printer AY 103 checks whether the printer AY 103 is included in a list of the devices known by the host computer 101a (a list based on the cache information 971). In this example, the printer AY 103 determines that the printer AY 103 is not included in the list 971 of the devices known by the host computer 101a. In step 954, by using the Multicast DNS technology, the printer AY 103 notifies devices existing in the same network of the IP address 831, the device name 832, and the service type 833 of the printer AY 103. More specifically, the printer AY 103 notifies devices of the printer information in conformance with the Bonjour protocol.

In step 956, the host computer 101a adds the IP address 831, the device name 832, and the service type 833 of the printer AY 103 to the cache information 971.

In step 957, the host computer 101a uses the information received from the printer AY 103 for the subsequent processing.

Figure 13:
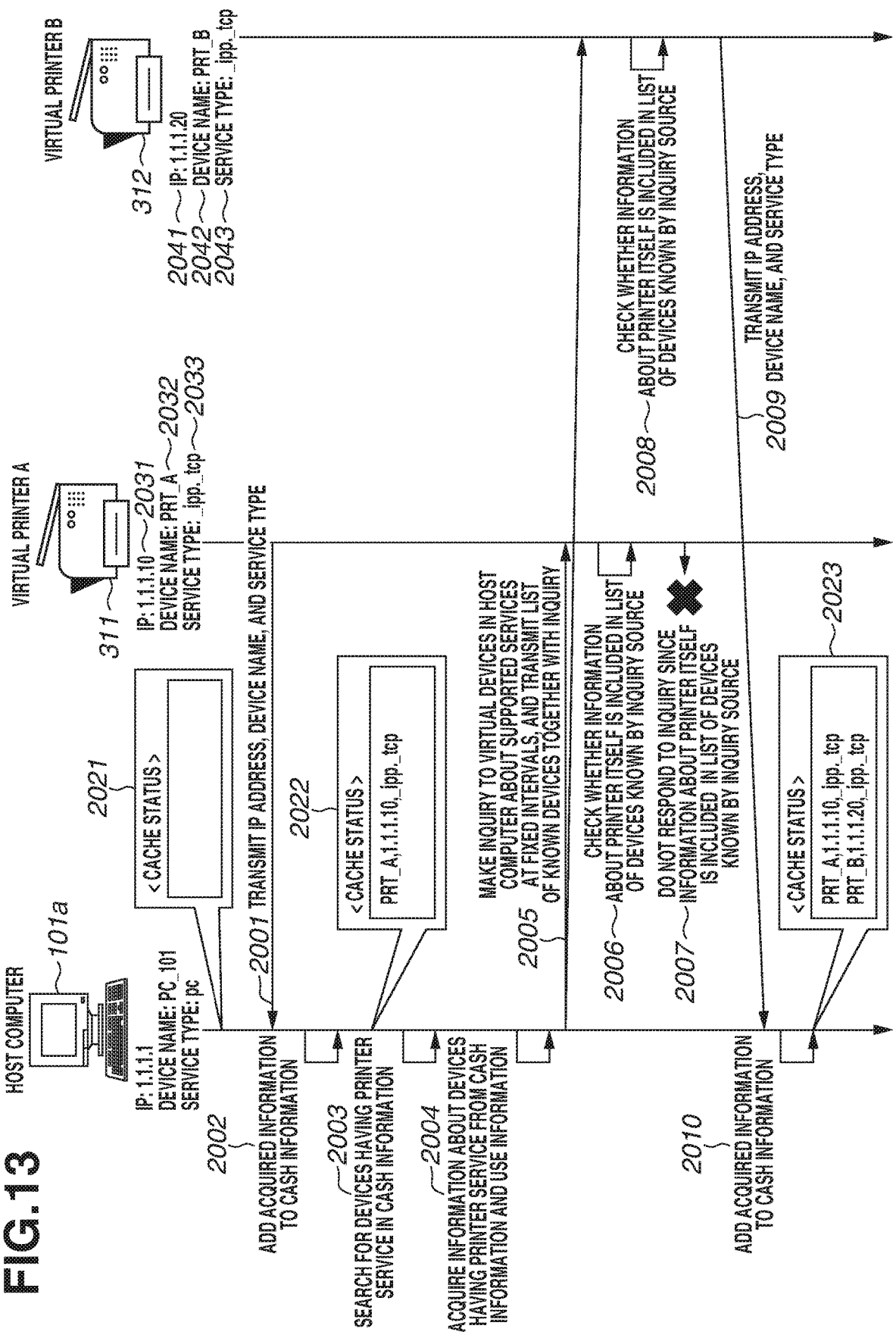
FIG. 13 is a sequence diagram illustrating virtual printer search processing in a host computer.

FIG. 13 is a sequence diagram illustrating virtual printer search processing for the virtual printers generated in the host computer 101a.

The virtual printer A 311 and the virtual printer B 312 have been generated in the host computer 101a. In the following example, the virtual printer A 311 notifies the host computer 101a of the presence of the virtual printer A 311 itself, and the virtual printer B 312 notifies the host computer 101a of the presence of the virtual printer B 312 itself in response to the search from the host computer 101a.

In step 2001, by using the Multicast DNS technology, the virtual printer A 311 notifies the host computer 101a of an IP address 2031, a device name 2032, and a service type 2033 of the virtual printer A 311. More specifically, the virtual printer A 311 notifies the host computer 101a of the printer information in conformance with the Bonjour protocol.

In step 2002, the host computer 101a that has received the notification from the virtual printer A 311 adds the IP address 2031, the device name 2032, and the service type 2033 of the virtual printer A 311 to cache information 2021.

In step 2003, in searching for virtual printers in the host computer 101a, the host computer 101a first searches for devices having the service types illustrated in Table 4 based on cache information 2022. In step 2004, in a case where information about the virtual printer A 311 is included in the cache information 2022, the information, about the virtual printer A 311, which is included in the cache information 2022 is used for the subsequent processing.

In step 2005, by using the Multicast DNS technology, the host computer 101a makes an inquiry to the virtual printers in the host computer 101a about supported services at regular intervals. More specifically, the host computer 101a transmits a device search request in conformance with the Bonjour protocol. The host computer 101a notifies the virtual printers in the host computer 101a of a list of the devices known by the host computer 101a (a list based on the cache information 2022), together with the inquiry.

In step 2006, the printer A 311 that has received the inquiry from the host computer 101a checks whether the virtual printer A 311 is included in the list 2022 of the devices known by the host computer 101a. In step 2007, the virtual printer A 311 determines that the virtual printer A 311 is included in the list 2022 of the devices known by the host computer 101a, and thus does not respond to the inquiry of the host computer 101a.

In step 2008, the virtual printer B 312 that has received the inquiry from the host computer 101a checks whether the virtual printer B 312 is included in the list 2022 of the devices known by the host computer 101a. The virtual printer B 312 determines that the virtual printer B 312 is not included in the list 2022 of the devices known by the host computer 101a. In step 2009, by using the Multicast DNS technology, the virtual printer B 312 notifies the host computer 101a of an IP address 2041, a device name 2042, and a service type 2043 of the virtual printer B 312. More specifically, the virtual printer B 312 notifies the host computer 101a of the printer information in conformance with the Bonjour protocol.

In step 2010, the host computer 101a adds the IP address 2041, the device name 2042, and the service type 2043 of the virtual printer B 312 to the cache information 2022.

Figure 14:
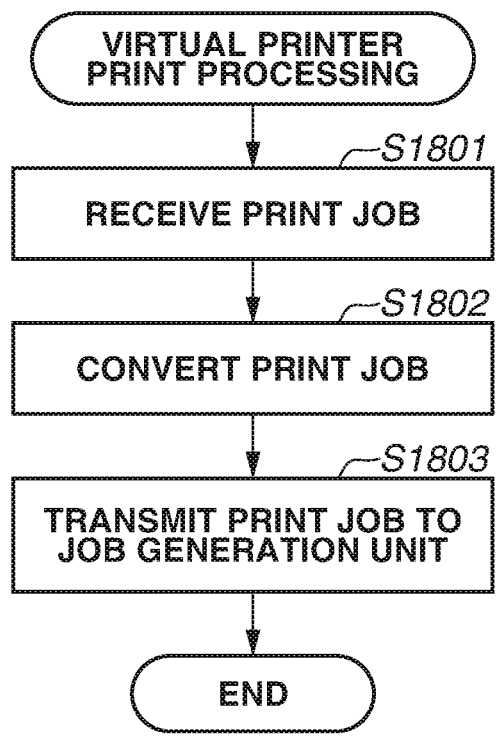
FIG. 14 is a flowchart illustrating an example of processing of a virtual printer at the time of printing.

FIG. 14 is a flowchart illustrating an example of processing of a virtual printer at the time of printing.

In step S1801, when a virtual printer (for example, the virtual printer A 311) receives a print job from the printing system 301 of the OS 210, the processing proceeds to step S1802.

In step S1802, the virtual printer converts the print job received in step S1801 into a format recognizable by the job generation unit 303. Examples of formats recognizable by the job generation unit 303 include Portable Document Format (PDF).

In step S1803, the virtual printer transmits the print job having undergone the conversion in step S1802 to the job generation unit 303. The processing then exits this flowchart.

Figure 15:
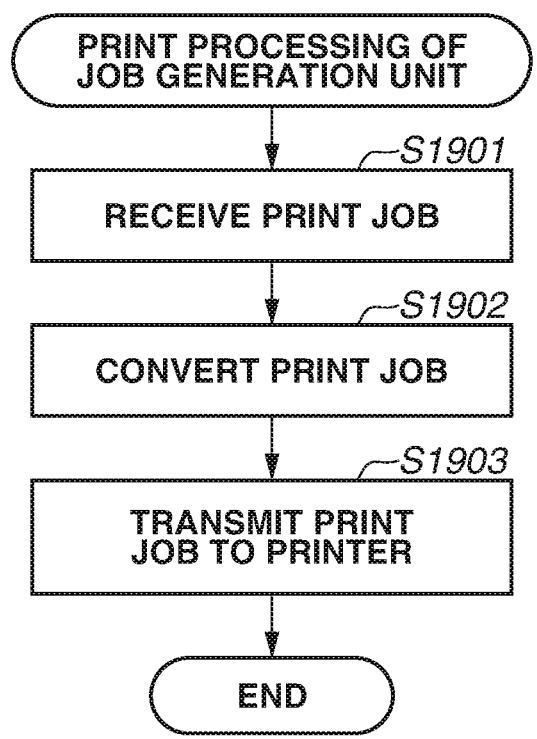
FIG. 15 is a flowchart illustrating an example of processing of a job generation unit at the time of printing.

FIG. 15 is a flowchart illustrating an example of processing of the job generation unit 303 at the time of printing.

In step S1901, when the job generation unit 303 in the virtual printer service 211 receives a print job from a virtual printer (e.g., the virtual printer A 311), the processing proceeds to step S1902.

In step S1902, the job generation unit 303 converts the print job received in step S1901 into a format recognizable (interpretable) by a real printer (e.g., the printer AY 103) with which the virtual printer as the source of the print job is associated. Examples of formats recognizable by a real printer include the raster format.

In step S1903, the job generation unit 303 transmits the print job having undergone the conversion in step S1902 to the real printer with which the virtual printer as the source of the print job is associated. The processing then exits this flowchart.

Processing for generating virtual printers without receiving an operation for instructing to generate virtual printers from the user will be described below.

After the virtual printer service 211 is installed in the flowchart illustrated in FIG. 6 (immediately after step S502 illustrated in FIG. 6), the virtual printer service 211 is automatically activated by the installer 402. Alternatively, the virtual printer service 211 is automatically activated by the OS 210 afterwards. If no virtual printer exists in the host computer 101 when the virtual printer service 211 is activated, the virtual printer service 211 performs second virtual printer generation processing illustrated in FIG. 16 to automatically generate virtual printers.

Figure 16:
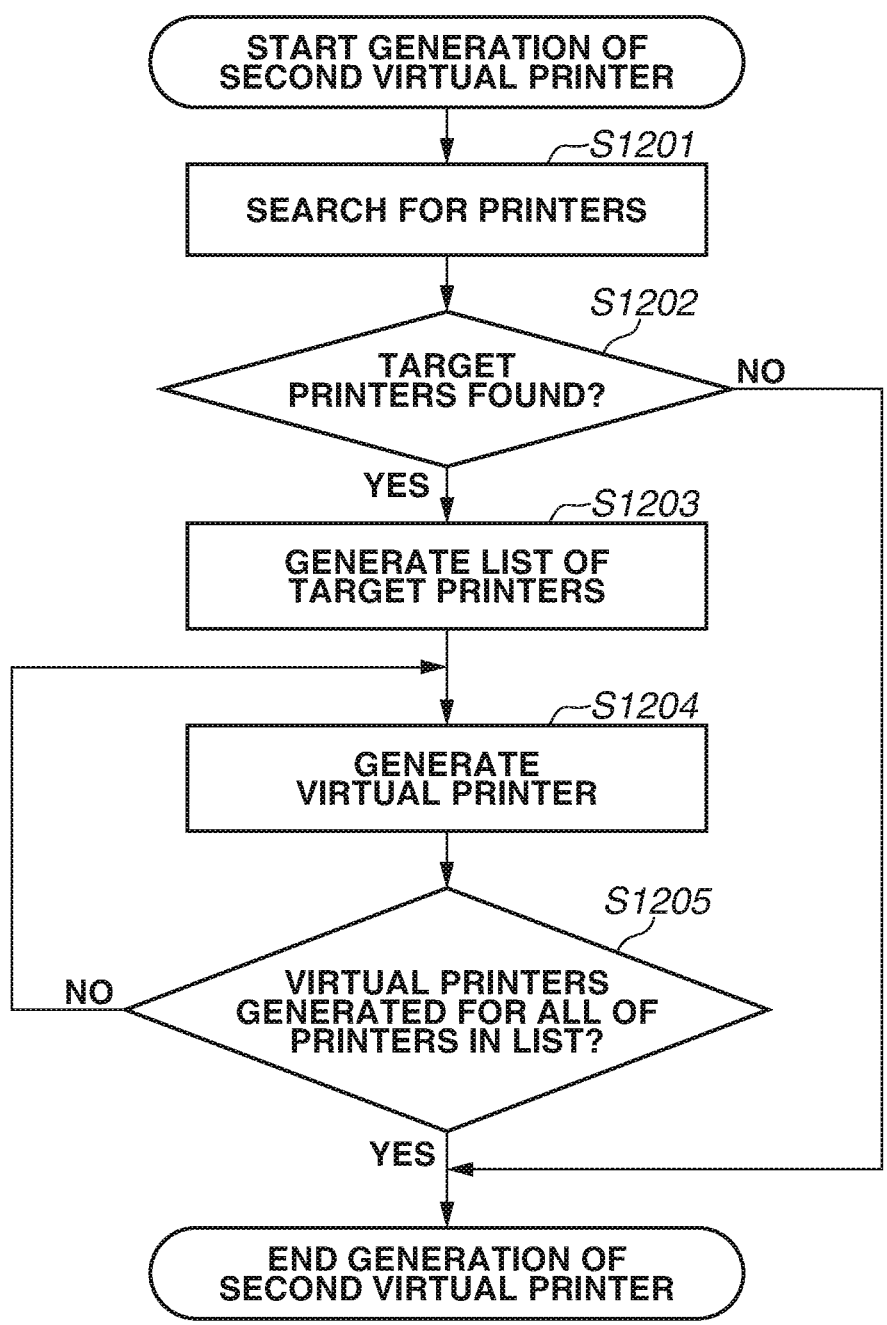
FIG. 16 is a flowchart illustrating an example of second virtual printer generation processing according to a first exemplary embodiment.

FIG. 16 is a flowchart illustrating an example of second virtual printer generation processing according to the first exemplary embodiment. The processing illustrated in this flowchart is performed by the virtual printer service 211.

In step S1201, as in step S602 illustrated in FIG. 7, the virtual printer service 211 performs the printer search processing. The printer search processing is implemented by performing the processing illustrated in FIG. 12 (described below). For example, by using the functions of the OS 210, the virtual printer service 211 transmit a search request conforming to the Bonjour protocol to the network 100 and receive a response to the search request from devices on the network 100, thus performing the device search processing.

In step S1202, as in step S603 in FIG. 7, the virtual printer service 211 determines whether the printers found in step S1201 include the target printers for the virtual printer service 211. To perform this determination for the target printers, the virtual printer service 211 utilizes a list of the target printers for the virtual printer service 211 stored in the virtual printer service 211. If this list includes a printer found in step S1201, the virtual printer service 211 determine this printer as the target printer.

Table 6 illustrates an example of information about a list of the target printers for the virtual printer service 211.

TABLE 6

|  | Printer Name |
|---|---|
| Target Printers for Virtual Printer Service | Printer AY<br>Printer BZ<br>Printer CX |

The list of the target printers includes only the printers supported by the virtual printer service 211 among printers not supported by the printing system which enables printing without using a printer driver (i.e., among printers not conforming to a specific protocol). This list is stored in the virtual printer service 211 before the virtual printer service 211 is installed. Referring to Table 6, "Printer name" indicates the names of the applicable printers.

Table 7 illustrate an example of information about a list of the printers found in step S1201.

TABLE 7

|  | Printer Name | IP Address | Service Type |
|---|---|---|---|
| Printers Found in Step S1201 | Printer Y | 1.1.1.30 | _ipp._tcp |
|  | Printer Z | 1.1.1.40 | _ipp._tcp |
|  | Printer AY | 1.1.1.3 | _printer._tcp |
|  | Printer BZ | 1.1.1.4 | _printer._tcp |
|  | Printer CX | 1.1.1.5 | _ipp._tcp |

Referring to Table 7, "Printer name" indicates the names of the applicable printers. "Printer name" is the names of the printers prestored in the applicable printers, and corresponds to the printer names notified (responded) in conformance with the Bonjour protocol from the applicable printers when the printers were found in step S1201. "IP address" indicates the addresses of the applicable printers on the network. "Service type" indicates the services supported by the applicable printers. For example, a device having the service type "_printer._tcp" means a printer conforming to the LPD protocol.

Table 7 displays a list of all of the printers found in step S1201.

The virtual printer service 211 compares the printers illustrated in Tables 6 and 7 to determine whether the found printers are the target printers for the virtual printer service 211. According to the present exemplary embodiment, for example, examples of conditions for the target printers include not having the IPP protocol (specific protocol) and being the target printers for the virtual printer service 211. In the examples illustrated in Tables 6 and 7, the printer AY and the printer BZ are determined to be the target printers.

If the printers found in step S1201 include none of the target printers for the virtual printer service 211 (NO in step S1202), the processing exits this flowchart.

If the printers found in step S1201 include the target printers for the virtual printer service 211 (YES in step S1202), the processing proceeds to step S1203.

In step S1203, the virtual printer service 211 generate a list of the printers determined to be the target printers in step S1202 (a list of the target printers). In the above-described example, the virtual printer service 211 generate a list including two printers, the printer AY and the printer BZ.

In step S1204, the virtual printer service 211 generate virtual printers. More specifically, the virtual printer service 211 select one of unprocessed target printers (target printers not having undergone the processing in step S1204) from the list generated in step 1203. The virtual printer service 211 then generates a virtual printer with the selected target printer as the connection destination. In this case, the IP address (illustrated in Table 7) acquired in the search processing in step S1201 is used as connection destination information. The generated virtual printer is registered as a service program in the OS 210. The virtual printer registered as a service program in the OS 210 constantly operates during execution of the OS 210 and issues responses in response to inquiries from other programs and information apparatuses. Accordingly, it seems to other programs and information apparatuses that virtual printers exist as real printers.

In step S1205, the virtual printer service 211 determines whether virtual printers are generated in step S1204 for all of the printers in the list generated in step S1203. If the list generated in step S1203 includes a printer for which a virtual printer has not yet been generated in step S1204 (NO in step S1205), the processing returns to step S1204. The processing then proceeds to the processes for the next printer.

If a virtual printer has been generated in step S1204 for all of the printers in the list generated in step S1203 (YES in step S1205), the processing exits this flowchart.

The above-described processing makes it possible to automatically generate virtual printers in the host computer 101. Thus, a method for performing printing via virtual printers reduces the user's trouble until printing becomes ready, making it easier to achieve a printing ready state with user's labor similar to that in the conventional method for installing a printer driver in the OS to perform printing.

A second exemplary embodiment of the present disclosure will be described below. The first exemplary embodiment has been described above centering on a configuration in which, in a case where no virtual printer has been generated when the virtual printer service 211 is activated, printer search is automatically performed without user operations and virtual printers are generated for the found printers. In the second exemplary embodiment, a description will be provided of a configuration for semi-automatically generating virtual printers (user operations are required in some cases). More specifically, a description will be provided of a configuration in which printer search is automatically performed without user operations, but user operations are required to generate virtual printers for the found printers.

Figure 17:
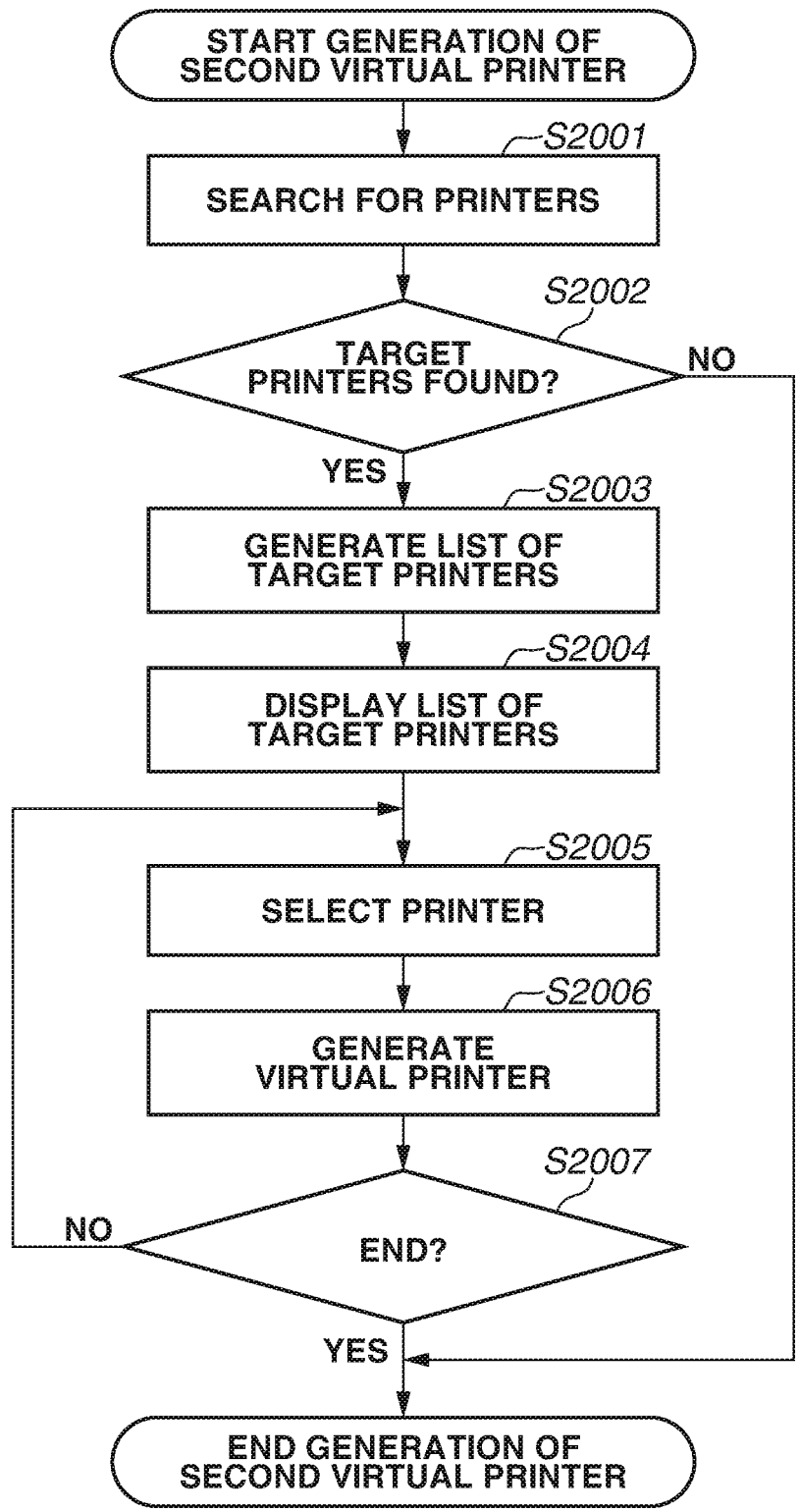
FIG. 17 is a flowchart illustrating an example of second virtual printer generation processing according to a second exemplary embodiment.

FIG. 17 is a flowchart illustrating an example of second virtual printer generation processing according to the second exemplary embodiment. As in the processing illustrated in FIG. 16, the processing illustrated in this flowchart is performed by the virtual printer service 211.

Operations in Steps S2001 to S2003 are similar to those in steps S1201 to S1203 illustrated in FIG. 16, and redundant descriptions thereof will be omitted.

In step S2004, the virtual printer service 211 displays a list of the target printers generated in step 1203, as illustrated in the area 1011 of the virtual printer addition screen illustrated in FIG. 8B.

In step S2005, the virtual printer service 211 performs processing for selecting the printer to be the connection destination of the virtual printer. When the user selects a printer from the list displayed in step S2004, the virtual printer service 211 detects this selection. The processing then proceeds to step S2006.

In step S2006, the virtual printer service 211 generates a virtual printer to be connected with the printer selected in step S2005. In this case, the IP address (illustrated in Table 7) acquired in the search processing in step S1201 is used as connection destination information. The generated virtual printer is registered as a service program in the OS 210. The virtual printer registered as a service program in the OS 210 constantly operates during execution of the OS 210 and issues responses in response to inquiries from other programs and information apparatuses. Accordingly, it seems to other programs and information apparatuses that virtual printers exist as real printers.

In step S2007, the virtual printer service 211 determines whether the user performs an end operation. If the user does not perform the end operation (NO in step S2007), the processing returns to step S2005. In step S2005, the virtual printer service 211 receives the selection of the next printer from the user.

If the user performs the end operation (YES in step S2007), the processing exits this flowchart.

The above-described processing makes it possible to semi-automatically generate virtual printers in the host computer 101. Thus, a method for performing printing via virtual printers reduces the user's trouble until printing becomes ready, making it easier to achieve a printing ready state.

A third exemplary embodiment of the present disclosure will be described below. In the third exemplary embodiment, a description will be provided of another configuration for semi-automatically generating virtual printers (user operations are required in some cases). More specifically, the virtual printer service 211 makes an inquiry to the user about whether to perform printer search (virtual printer generation) and, in a case where the virtual printer service 211 receives an execution operation from the user, the virtual printer service 211 performs printer search.

Figure 18:
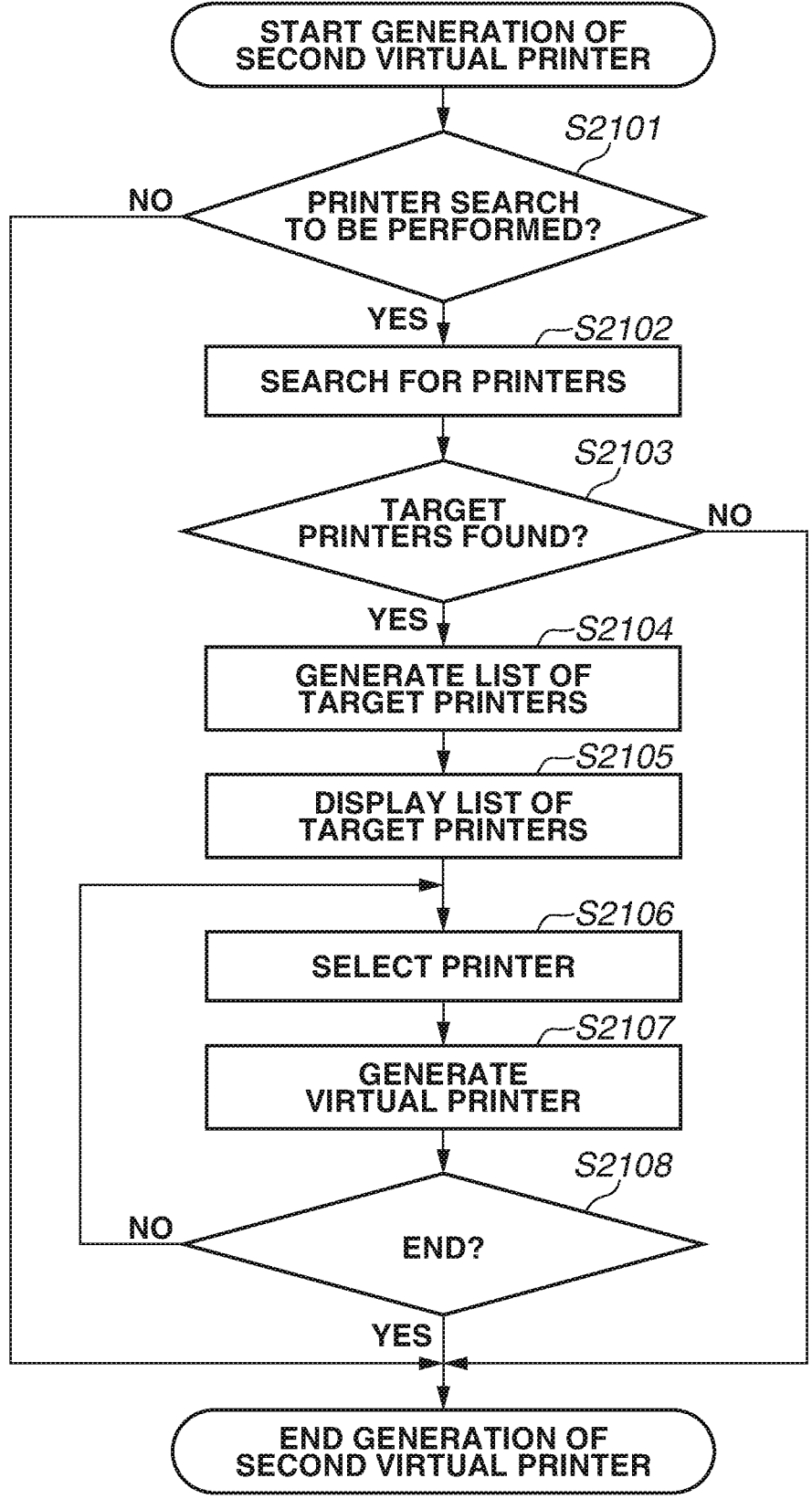
FIG. 18 is a flowchart illustrating an example of second virtual printer generation processing according to a third exemplary embodiment.

FIG. 18 is a flowchart illustrating an example of second virtual printer generation processing according to the third exemplary embodiment. As in the processing illustrated in FIG. 17, the processing illustrated in this flowchart is performed by the virtual printer service 211.

In step S2101, the virtual printer service 211 displays a message such as "Do you want to perform printer search?" (or "Do you want to generate virtual printers?") and receives a ("Yes"/"No") selection operation. If the virtual printer service 211 receives the selection operation indicating "No" from the user, the processing exits this flowchart.

If the virtual printer service 211 receives the selection operation indicating "Yes" from the user, the processing proceeds to step S2102.

Processes in steps S2102 to S2108 are similar to the processes in steps S2001 to S2007 illustrated in FIG. 17, and redundant descriptions thereof will be omitted. Instead of the processing in steps S2102 to S2108, the processing in steps S1201 to 1205 illustrated in FIG. 16 may be performed.

The above-described processing makes it possible to semi-automatically generate virtual printers in the host computer 101. Thus, a method for performing printing via virtual printers reduces the user's trouble until printing becomes ready, making it easier to achieve a printing ready state.

A fourth exemplary embodiment of the present disclosure will be described below. In the first to the third exemplary embodiments, descriptions have been provided of configurations for automatically or semi-automatically generating virtual printers when the virtual printer service 211 is activated. In the fourth exemplary embodiment, a description will be provided of a configuration for automatically generating virtual printers and registering the virtual printers in the OS 210 when the printing system of the OS 210 displays a "Printer registration screen".

Figure 19:
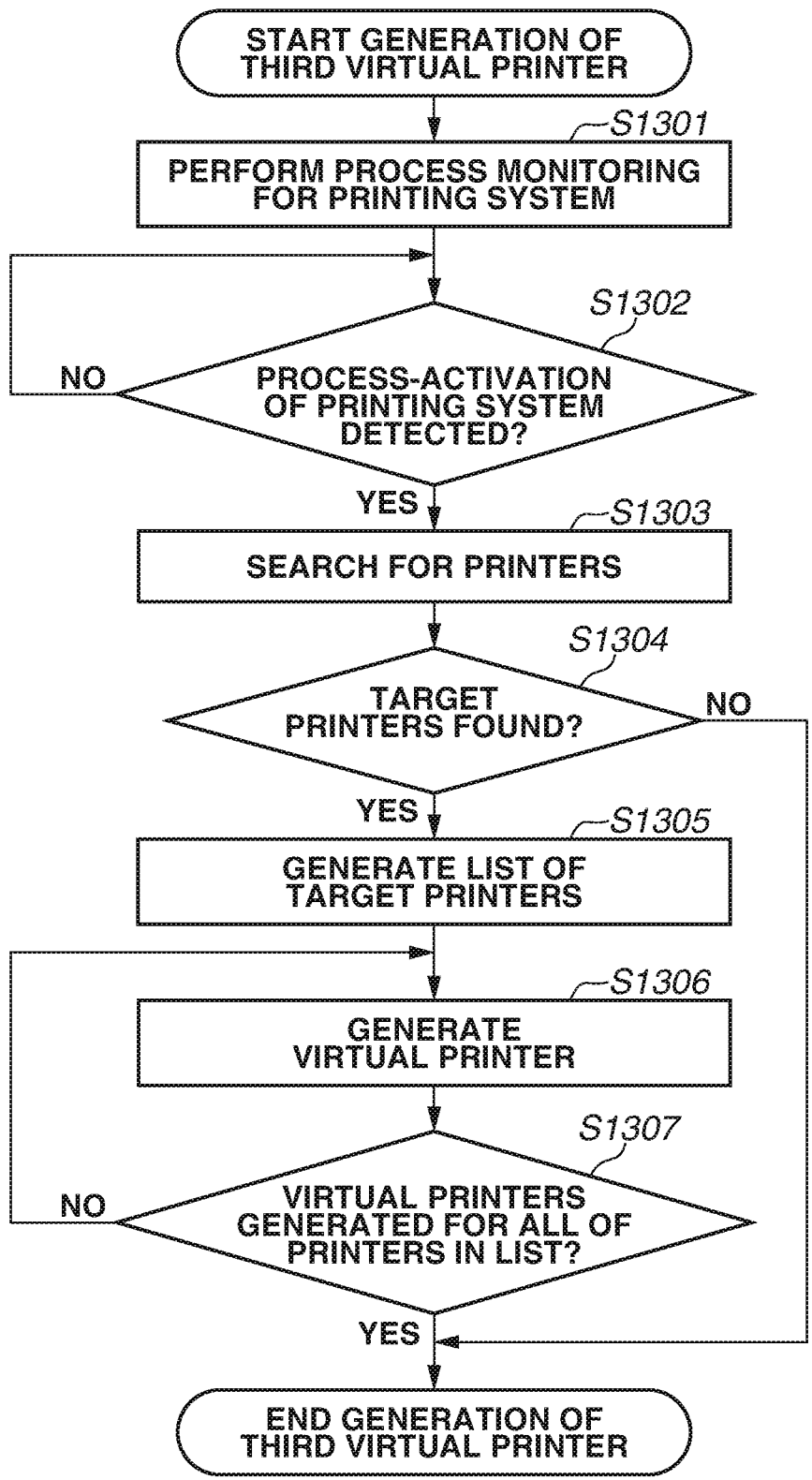
FIG. 19 is a flowchart illustrating an example of third virtual printer generation processing according to a fourth exemplary embodiment.

FIG. 19 is a flowchart illustrating an example of third virtual printer generation processing according to the fourth exemplary embodiment. The processing of this flowchart is automatically performed by the virtual printer service 211 which operates as a service program when the printing system of the OS 210 displays the "Printer registration screen", i.e., immediately after step S701 illustrated in FIG. 9.

In step S1301, the virtual printer service 211 performs process-monitoring for monitoring the process of the printing system and then proceeds to step S1302.

In step S1302, the virtual printer service 211 determines whether process-activation of the printing system is detected through the process-monitoring for the printing system in step S1301. If the process-activation of the printing system is not detected (NO in step S1302), the virtual printer service 211 continues the process-monitoring for the printing system in step S1301.

If the process-activation of the printing system is detected (YES in step S1302), the processing proceeds to step S1303. Processes in steps S1303 to S1307 are similar to the processes in steps S1201 to S1205 illustrated in FIG. 16, and redundant descriptions thereof will be omitted. In step S1306, the generated virtual printer is registered as a service program in the OS 210. The virtual printer registered as a service program constantly operates during execution of the OS 210 and issues responses in response to inquiries from other programs and information apparatuses. Accordingly, it seems to other programs and information apparatuses that virtual printers exist as real printers. More specifically, the generated virtual printers respond like real printers in the search processing for a printer in step S702 illustrated in FIG. 9.

The above-described processing makes it possible to automatically generate virtual printers and register the virtual printers in the OS 210 when the printing system of the OS 210 displays the "Printer registration screen". Thus, a method for performing printing via virtual printers reduces the user's trouble until printing becomes ready, making it easier to achieve a printing ready state with user's labor similar to that in the conventional method for installing a printer driver in the OS before performing printing.

In step S1301 of FIG. 19, the virtual printer service 211 performs the process-monitoring for the printing system. In a case where the virtual printer service 211 detects the process-activation of the printing system in step S1302, the virtual printer service 211 performs the processes in step S1303 and the subsequent steps to automatically generate virtual printers. However, in a case where the virtual printer service 211 intercepts the device search by the OS 210 in step S702 illustrated in FIG. 9, the virtual printer service 211 may perform the processes in step S1303 and subsequent steps to automatically generate virtual printers.

A fifth exemplary embodiment of the present disclosure will be described below. Descriptions of the first to the third exemplary embodiments have been provided of configurations for automatically or semi-automatically generating virtual printers when the virtual printer service 211 is activated. In the fourth exemplary embodiment, a description has been provided of a configuration for automatically generating virtual printers when the printing system of the OS 210 displays the "printer registration screen".

In the fifth exemplary embodiment, a description will be provided of a configuration for guidance to the main UI of the virtual printer service 211.

Figure 20:
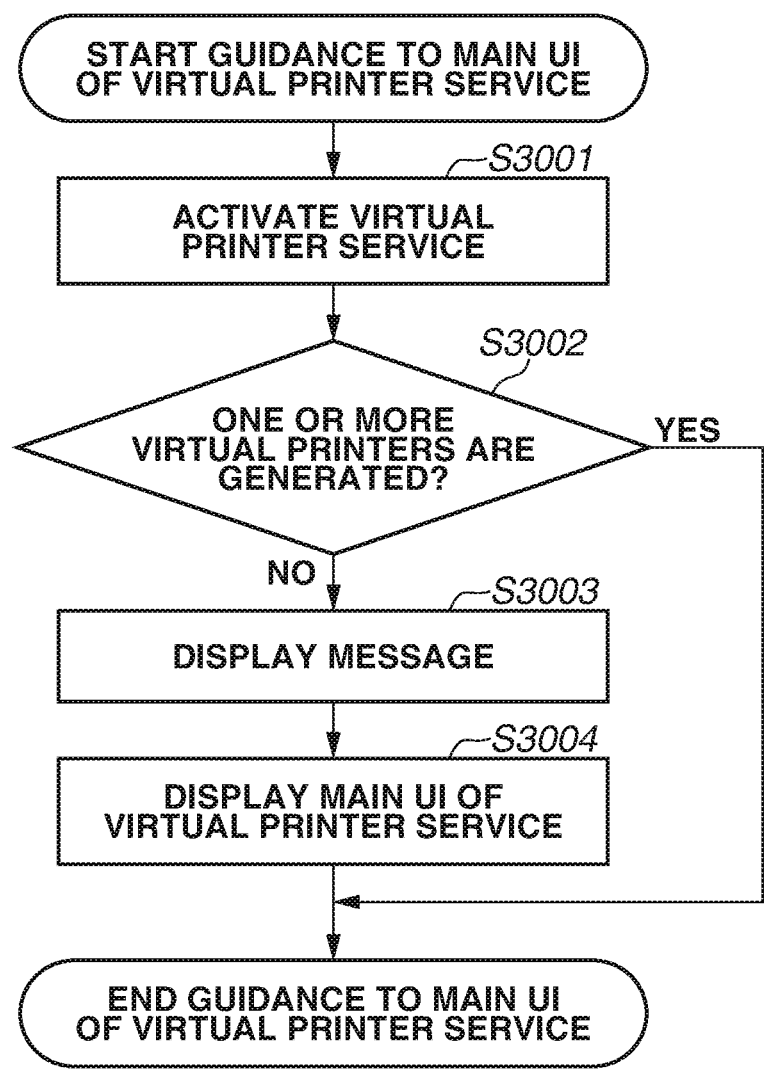
FIG. 20 is a flowchart illustrating an example of processing for guidance to a main UI of virtual printer services according to a fifth exemplary embodiment.

FIG. 20 is a flowchart illustrating an example of processing for guidance to the main UI of the virtual printer service 211 according to the fifth exemplary embodiment. The processing illustrated in this flowchart is performed by the virtual printer service 211.

When the virtual printer service 211 is activated in step S3001, the virtual printer service 211 then performs processes in step S3002 and subsequent steps. After the virtual printer service 211 is installed in the flowchart illustrated in FIG. 6, the virtual printer service 211 is automatically activated by the installer 402. Alternatively, the virtual printer service 211 is automatically activated by the OS 210 afterwards. The virtual printer service 211 is also activated in a case where the user manually issues an explicit activation instruction.

In step S3002, the virtual printer service 211 determines whether a virtual printer exists within the host computer 101. To perform this determination of the presence of the target printers, the virtual printer service 211 utilizes a list of the registered virtual printers included in the virtual printer service 211. If the virtual printer service 211 determines that at least one virtual printer exists in the list (YES in step S3002), the processing exits this flowchart.

Figure 21:
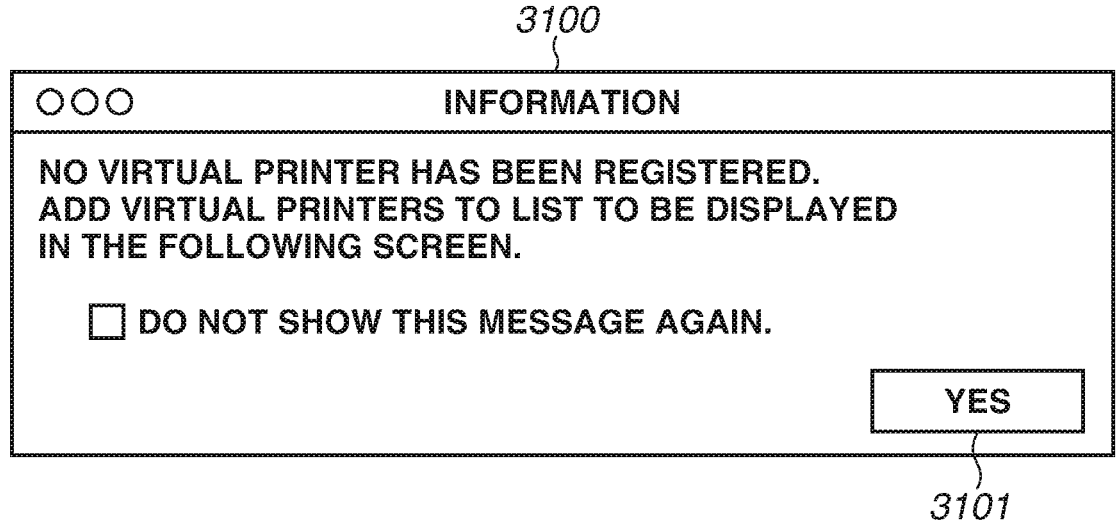
FIG. 21 illustrates an example of a message for guidance to the main UI of virtual printer services according to the fifth exemplary embodiment.

If the virtual printer service 211 determines that no virtual printer exists in the list (NO in step S3002), the processing proceeds to step S3003. In step S3003, the virtual printer service 211 displays a message for guidance to the main UI of the virtual printer service 211. FIG. 21 illustrates an example of a message for guidance to the main UI of the virtual printer service 211 according to the fifth exemplary embodiment.

When the user presses a "Yes" button 3101 in a display screen 3100 for the message for guidance to the main UI of the virtual printer service 211 illustrated in FIG. 21, the processing proceeds to step S3004.

In step S3004, the virtual printer service 211 displays the above-described screen illustrated in FIG. 8A (the main UI of the virtual printer service 211). The processing then exits this flowchart. The virtual printer service 211 performs the processing of the flowchart illustrated in FIG. 7 to perform processing for generating virtual printers in response to a main UI display operation by the user.

In the present exemplary embodiment, a screen for guidance to the screen for receiving an operation for generating virtual printers is displayed in a case where no virtual printer exists in the host computer 101 as described above. This configuration guides the user to the screen for receiving an operation for generating virtual printers to prompt the generation of virtual printers. This enables the user to naturally generate virtual printers according the guidance. As a result, a method for performing printing via virtual printers makes it easier to achieve a printing ready state.

According to each of the above-described exemplary embodiments, virtual devices are automatically or semi-automatically generated in an information processing apparatus as described above. Thus, a method for performing printing via virtual devices reduces the user's trouble until printing becomes ready, making it easier to achieve a printing ready state.

The present disclosure is not limited to the above-described configurations and details of various data, but it is needless to say that various configurations and details are applicable according to applications and purposes.

Although exemplary embodiments are illustrated, the present disclosure can be embodied, for example, as a system, an apparatus, a method, a program, or a storage medium. More specifically, the present disclosure is applicable to a system composed of a plurality of apparatuses and to an apparatus composed of one device.

Further, all of configurations derived by suitably combining the above-described exemplary embodiments are also intended to be included in the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, a method for performing printing via virtual devices reduces the user's trouble until printing becomes ready, making it easier to achieve a printing ready state.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-114524, filed Jun. 20, 2019, which is hereby incorporated by reference herein in its entirety.

What is claimed is:

1. An information processing apparatus comprising at least one processor and a storage that stores an application, wherein execution of the application by the at least one processor causes the information processing apparatus to:
determine whether a virtual printer configured to receive print data from an operating system, convert the print data to interpretable print data that a physical printer is able to interpret, and send the interpretable print data to the physical printer is registered in the application;
notify a user of a message regarding search of the physical printer or registration of the virtual printer based on a determination that no virtual printer is registered in the application;
search a network for the physical printer based on an instruction from the user, who has been notified of the message;
generate the virtual printer for the physical printer found by the search; and
notify to the operating system, information of the generated virtual printer so that the generated virtual printer is registered in the operating system.

2. The information processing apparatus according to claim 1, wherein the determination is performed based on an activation of the application.

3. The information processing apparatus according to claim 2, wherein the application is activated based on booting up of the information processing apparatus.

4. The information processing apparatus according to claim 1, wherein execution of the application by the at least one processor causes the information processing apparatus to:
display information about a plurality of printers found in the search;
receive a user operation for specifying information about one printer from among the displayed information about the plurality of printers; and
generate, based on reception of the user operation, the virtual printer corresponding to the one printer.

5. The information processing apparatus according to claim 4, wherein the virtual printer receives the print data from the operating system, converts the received print data into print data interpretable by the one printer, and provides the print data after the conversion to the one printer.

6. The information processing apparatus according to claim 5, wherein the one printer is unable to interpret the print data generated by the operating system.

7. The information processing apparatus according to claim 4, wherein, by information about the virtual printer being notified to the operating system, the virtual printer is subjected to printer registration by the operating system.

8. The information processing apparatus according to claim 1, wherein the application is activated in response to completion of installation of the application, and the application causes the information processing apparatus to perform the determination in response to the activation of the application.

9. An information processing method comprising:
determining whether a virtual printer configured to receive print data from an operating system, to convert the print data to interpretable print data that a physical printer is able to interpret, and to send the interpretable print data to the physical printer is registered in an application;
notifying a user of a message regarding search of the physical printer or registration of the virtual printer based on a determination that no virtual printer is registered in the application;
searching a network for the physical printer based on an instruction from the user, who has been notified of the message;
generating the virtual printer for the physical printer found by the search; and
notifying information of the generated virtual printer to the operating system so that the generated virtual printer is registered in the operating system.

10. The information processing method according to claim 9, wherein the determination is performed based on an activation of the application.

11. The information processing method according to claim 10, wherein the application is activated based on booting up of the information processing apparatus.

12. The information processing method according to claim 9, further comprising:
displaying information about a plurality of printers found in the search;
receiving a user operation for specifying information about one printer from among the displayed information about the plurality of printers; and
generating, based on reception of the user operation, the virtual printer corresponding to the one printer.

13. The information processing method according to claim 12, wherein the virtual printer receives the print data from the operation system, converts the received print data into print data interpretable by the one printer, and provides the print data after the conversion to the one printer.

14. The information processing method according to claim 13, wherein the one printer is unable to interpret the print data generated by the operating system.

15. The information processing method according to claim 12, wherein, by information about the virtual printer being notified to the operating system, the virtual printer is subjected to printer registration by the operating system.

* * * * *